INVENTORS
GEORGE W. VON HOFE
JOHN F. SPANO
BY

*John J. Hart*

ATTORNEY

INVENTORS
GEORGE W. VON HOFE
JOHN F. SPANO
BY

John J. Hart
ATTORNEY

INVENTORS
GEORGE W. VON HOFE
JOHN F. SPANO
BY
John J. Hart
ATTORNEY

INVENTORS
GEORGE W. VON HOFE
JOHN F. SPANO
BY
John F. Hart
ATTORNEY

INVENTORS
GEORGE W. VON HOFE
JOHN F. SPANO
BY

*John F. Hart*

ATTORNEY

INVENTORS
GEORGE W. VON HOFE
JOHN F. SPANO

United States Patent Office

3,522,134
Patented July 28, 1970

3,522,134
HIGH SPEED LABELING MACHINE
George W. von Hofe, Millington, and John F. Spano, Cresskill, N.J., assignors to New Jersey Machine Corporation, Hoboken, N.J., a corporation of New Jersey
Continuation-in-part of application Ser. No. 539,920, Apr. 4, 1966. This application July 1, 1966, Ser. No. 562,229
Int. Cl. B65c 9/08, 9/14
U.S. Cl. 156—571                                                                41 Claims

ABSTRACT OF THE DISCLOSURE

The labeling machine comprises a plurality of label applicators movable about a first vertical axis mounted for pivotal movement about a second vertical axis located on a radial line extending through both axes. Means are operable to move each applicator approaching a station in the machine to positively change its angular position relative to the radial line and to change its position in the direction of the radial line so that its movement past the station is rectilinear rather than arcuate. At the label pick-up station the label magazine is constructed to coordinate its movements to the composite movements of the label applicators. At the label supplying station the composite movements are utilized to apply the labels to articles with a sustained forceful application. The machine includes means for initially spacing and then exactly registering the articles with respect to the applicators, and coordinated means for increasing the rate of label application and for enabling the use of roll labels in a machine of this type.

---

This application is a continuation-in-part of application Ser. No. 539,920, filed Apr. 4, 1966, by George W. von Hofe and John F. Spano for High Speed Labeling Machine, now abandoned.

The object of this invention is to provide a high speed precision labeling machine capable of handling a large range of labels and article sizes.

A further object of the invention is to provide a means capable of applying to labels finely controlled overall coatings of adhesive at higher speeds than is now possible in known existing labeling machines.

A further object of the invention is to smooth out the action of the mechanism in such machines so that high speeds of operation thereof can be accomplished without excessive wear of such mechanism thereby minimizing maintenance costs thereof.

A further object of the invention is to provide an improved labeling machine having an articulated label applicator that will operate at high speeds over a long period of time without substantial mechanical wear.

Another object is to provide an improved labeling machine with flat separable label applicators that are readily removable, thereby making it possible to provide the machine with low cost change parts for different sizes of labels.

A further object of the invention is to provide an improved labeling machine having a flat applicator capable of such compound movement at a portion of a closed path that it is enabled to engage an article over a wide area, for example, if a 3" wide label is being applied to a 3" wide article it will be applied totally to the article at the point of initial application.

A further object is to provide an improved high speed labeling machine which uses but a single source of label supply in order to keep the machine simple.

A further object is to provide an improved labeling machine having means to prevent the label applicator from being coated with adhesive when no label is present thereon.

A further object is to provide an improved labeling machine capable of applying labels from a roll or magazine to flat or odd-shaped containers, a single label at a time, in continuous progression.

A further object is to provide an improved labeling machine capable of applying labels with as wide a band of initial adhesion as possible to a round article.

A further object is to provide a high speed labeling machine capable of applying labels to the sides of articles in a wide range of sizes and dimensions thereof.

A further object is to provide a labeling machine having improved means for applying the labels to the articles with a pressing action while such articles are in motion.

A further object is to provide an improved high speed labeling machine capable of being readily converted from a single sided labeling machine to a two sided labeling machine, or vice versa.

A further object of the invention is to provide an improved labeling machine in which the vacuum system is of such simple construction that a single source of vacuum therefor can be used.

A still further object of the invention is to provide a labeling machine capable of reliably accomplishing the above objects with comparatively simple, rugged mechanism.

In accordance with the invention there is provided a labeling machine in which a label applicator thereof, which moves generally in a closed path about a central axis, travels with a linearly moving article under pressure for a substantial portion of its cycle. This is accomplished by having the label applicator articulated so that at the place of label application its motion can be modified to match that of the article for such portion of the cycle. A further use of this articulation feature of the label applicator is at the label pickup station, whereat the action of the device supplying the label to the applicator is modified and coordinated with the articulated movement of the applicator so that labels can be supplied smoothly to the applicator at relatively high speeds. By increasing the pitch of the label applicators in the region of the glue roll, and increasing the effective distance of each label applicator from said central axis as it passes over the glue roll, the radial action of the label applicators in the region of the glue roll is less severe, and an increase in speed of the machine is accomplished. By making the applicator compressible and reversing the vacuum used to hold the label to the applicator, to an air pressure blast, the initial contact between the article and the label is greatly increased.

For a better understanding of the invention reference is made to the accompanying drawings which show by way of example a form of machine embodying the invention and in which FIG. 1 is a schematic drawing showing the machine in plan view;

Figure 1:
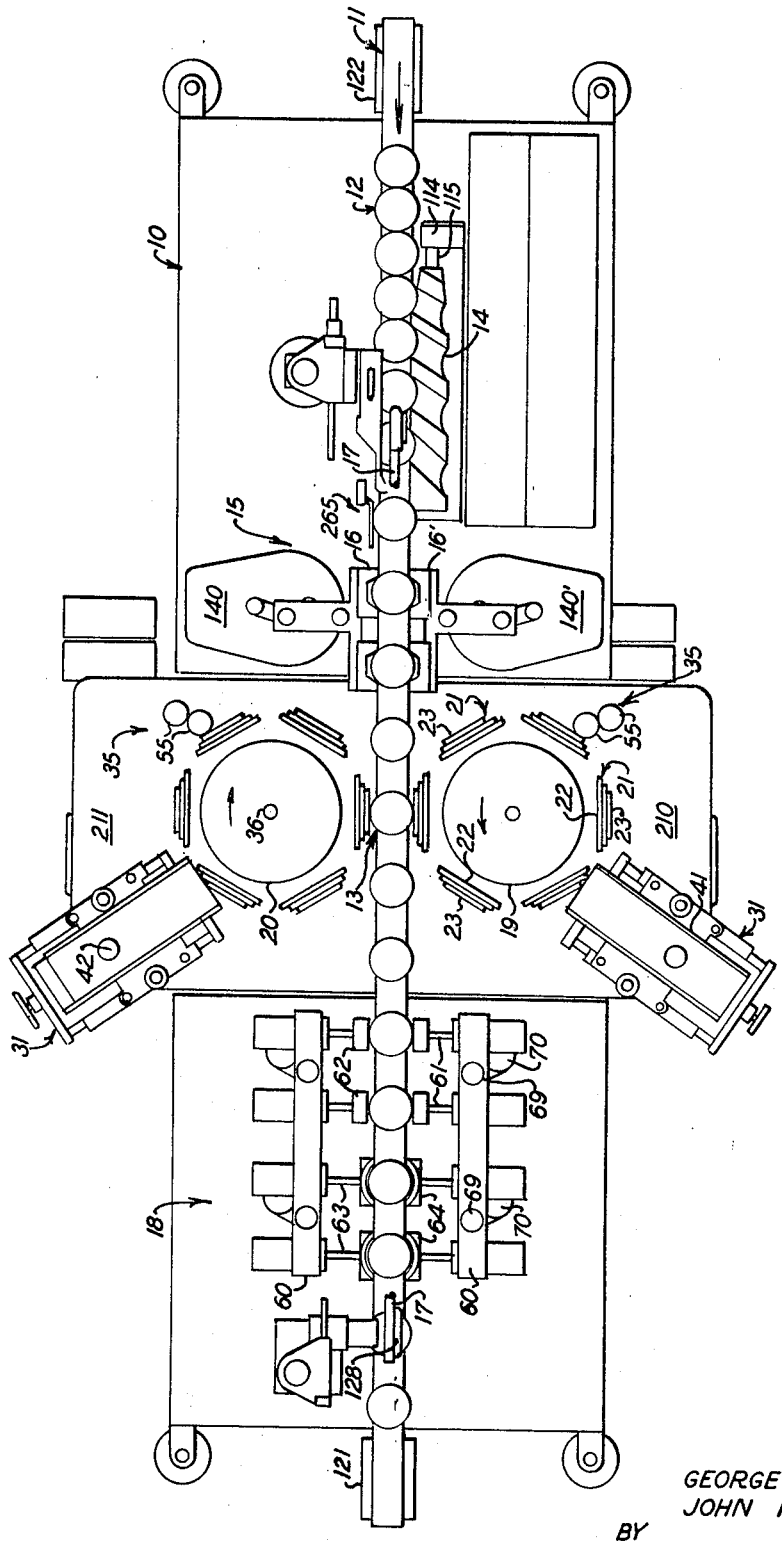

In the drawings, the reference numeral 10 indicates generally the frame of a high speed, precision label applying machine embodying the invention. Mounted on the frame 10 is an article conveyor 11 of usual construction for carrying the articles 12 to be labeled successively to and past the operating mechanisms as they travel through the machine. These operating mechanisms include a feed screw 14 at the entrance end of the machine, an article registering device 15 for positioning the articles on the conveyor so that they will come into precise registration with the applicators 21 which apply the labels thereto at the labeling station 13, and means for completing the application of the labels to the articles at a pressure station 18. During the travel of the articles from the feed screw 14 to and past the pressure station 18, the lower run of a pressure belt 17 overlying the conveyor 11, presses down on their tops so that the articles during such portion of their travel through the machine are held between such run of the belt 17 and the conveyor 11. The labels for the articles are supplied from two label pickup stations 31, 31 in the machine illustrated, and are rendered adhesive at the two stations 35, 35 prior to their application to the articles at station 13.

The feed screw 14 which is of known construction, is rotatably mounted so that it is located at one side of the article path in adjacent parallel relation to the entry end portion of the conveyor 11. The feed screw is driven from the main shaft of the machine in a manner which will be hereinafter more fully explained, through a train of gears 114 connected to one end of the shaft 115 of the feed screw. The gearing is designed to rotate the feed screw one revolution for every cycle of operation of the machine. Thus, if the machine is set up to label 200 articles per minute, the feed screw will rotate at a rate of 200 revolutions per minute to space the articles at a definite pitch so that they advance in timed relation to the mechanisms operating at that labeling speed.

The articles in their travel from the feed screw 14 are next engaged by the registering device 15 which adjusts them from the positions in which they have been left by the feed screw, to positions on the conveyor in which they will be presented to the label applicators 21 in precise registered position relative to the latter for accurate application of the labels thereto. As is shown in FIG. 1 of the drawings, the registering device 15 is composed of two units 140, 140' located one on each side of the conveyor 11 and having jaws 16, 16', respectively, disposed in opposed relation. The jaws 16, 16' are each constituted of a pair of article contacting heads of suitable material so that such jaws simultaneously engage two articles on the conveyor 11. The units 140, 140' are similar in construction except that the jaws 16 is provided with springs 139 to enable it to engage the articles with a yielding pressure, whereas the jaw 16' is not, but provides a rigid backing for the yielding pressure exerted by jaw 16 on the articles. In view of the similarity of the two units otherwise, only one of the units is shown and described in detail.

Figure 6:
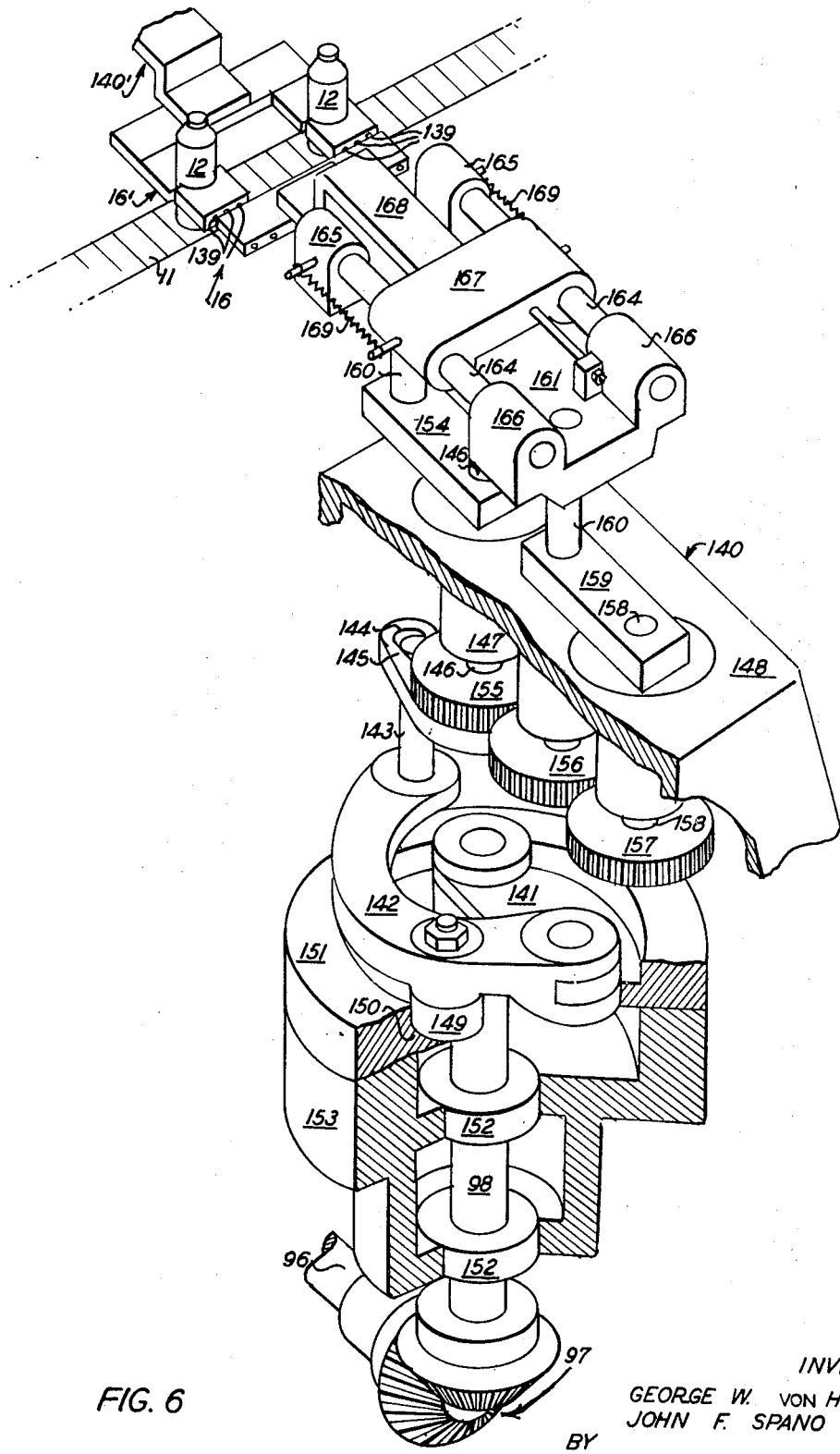
FIG. 6 is an enlarged perspective view, partly in section, of one of the units forming the article registering device.
Figure 9:
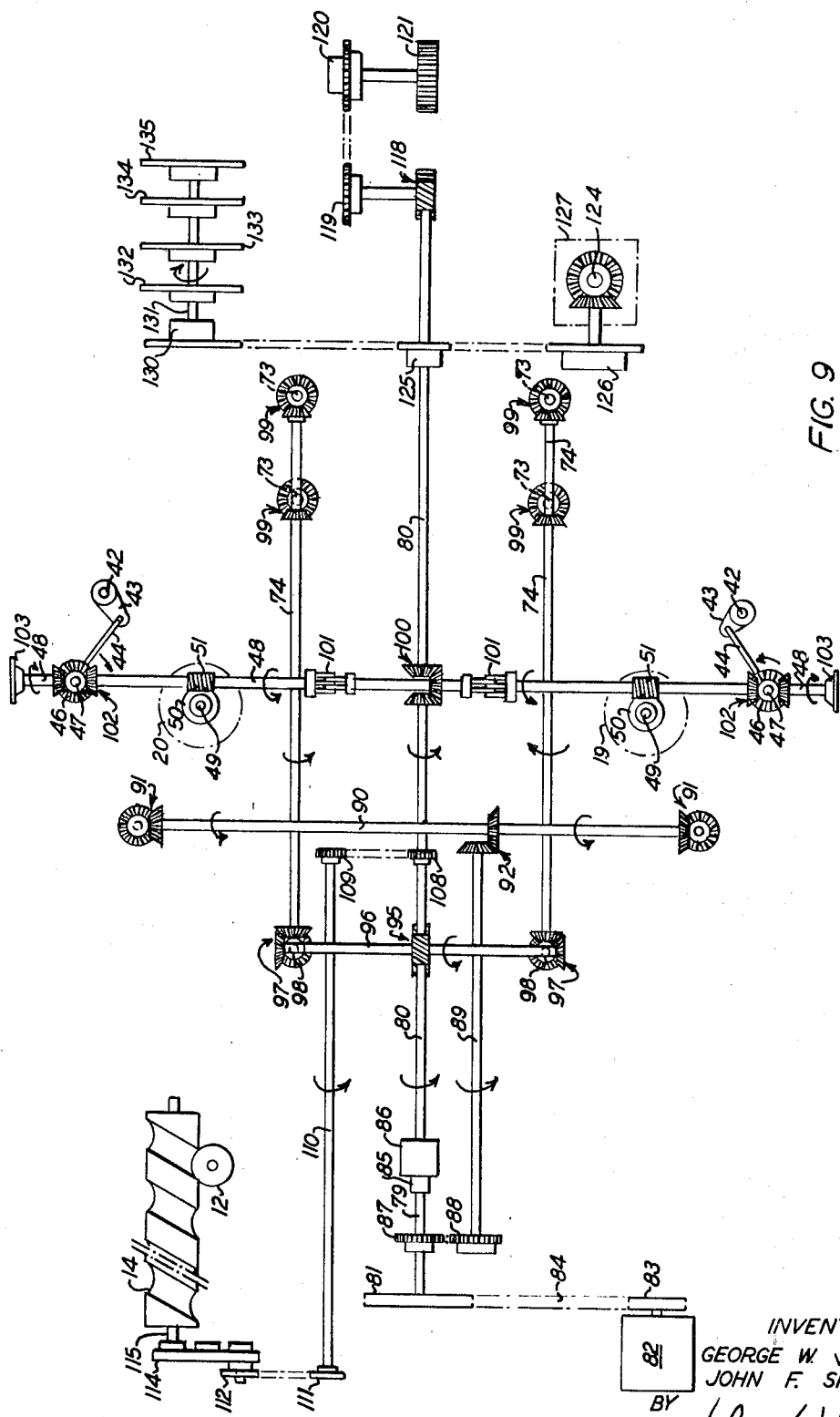
FIG. 9 is a diagrammatic drawing in plan view of the drive mechanism for the several devices in the machine.

Referring now to FIG. 6 of the drawings, each of the units 140, 140' is composed of a vertical shaft 98 which is connected at its lower end by gearing 97 to one end of a transverse shaft 96 connected in driven relation to the main shaft 80 of the machine in the manner shown more clearly in FIG. 9 of the drawings so that the shaft 98 in each unit is driven at a constant angular velocity, namely, one-half revolution per cycle of operation of the machine. Secured to shaft 98 is an arm 141 to the outer end of which is pivotally connected one end of a lever 142 which carries at its other end an upright vertical crank pin 143. The upper end of pin 143 engages an elongated slot 144 provided in the outer end of an arm 145 connected to the lower end of a shaft 146 mounted for rotational movement in a bearing 147 carried by the top wall 148 of the unit 140. The lever 142 is provided with a cam follower 149 which engages a cam track 150 formed in a stationary plate 151 mounted on a frame member 153 which also carries the shaft bearings 152, 152. The cam track 150 is constructed to cause the crankpin 143 to advance or retract angularly of the axis of rotation of arm 145 from a neutral position as the cam profile deviates from one side to the other of a given concentric pitch circle. The design of the cam track 150 is such that the arm 145 will be given a variable angular velocity by the crankpin 143, which angular velocity will be composed of additional increments of angular velocity to the normal velocity resulting from said given pitch circle and initiated slightly before the jaw 16 of the unit comes into engagement with the article, and a subtraction of increments of angular velocity initiated slightly after the period in which the jaw 16 of the unit moves away from the engaged article. It will thus be understood that as a result of the aforesaid construction, the arm 145 will be rotated about the axis of vertical shaft 146 with a given variable angular velocity although the input velocity imparted thereto by shaft 98 is a constant one.

The variable angular velocity of arm 145 will be transmitted to the shaft 146 and to an arm 154 connected to the top of shaft 146. Such variable angular velocity will be transmitted also to a gear 155 secured to shaft 146, and through an idler gear 156, to a driven gear 157 secured to the lower end of a vertical shaft 158 similar to and paired with shaft 146. Secured to the top of shaft 158 is an arm 159 which is similar to arm 154 and which because of the aforesaid construction will be rotated in synchronism with arm 154, the two arms, 154, 159 being connected to their shafts so that their rotational movements are exactly the same. The two arms 154, 159 are provided at their free ends with similarly located vertical pins 160, 160 on which is mounted a carriage 161 so that the latter is given a translatory rotational movement about the axes of the shafts 146, 158, such movement being of the same variable angular velocity as that of such shafts. The carriage 161 is provided with a pair of spaced guide members 164, 164 extending in parallelism to a line connecting the axes of the shafts 146, 158. The supports 165, 165 for the forward ends of such guide members and the supports 166, 166 for the rear ends of such members function as stops to restrict the movements of a slide 167 movably mounted on such guide members. The slide 167 is provided with an integral, forwardly extending bracket 168 on the forward end of which is secured the jaw 16. Tension springs 169, 169 connected to the stops 165, 165 and the slide 167 normally biases the slide 167 to its forward position in which the spring tensioned jaw 16 will engage and yieldably press the articles 12 on the conveyor 11 against the unyielding jaws 16'.

It will be understood from the foregoing that in the translatory rotational movements of the carriage 161, the jaw 16 will move into engagement with the articles 12, 12 and after a given period of time will move out of engagement of the same. As a result of the spring tensioned slide 167 and the springs 139 supporting the jaw 16, the latter will move along a straight line during its engagement with the articles 12. As previously indicated, the configuration of the cam track 150 will cause the jaw 16 to progressively modify its rotational speed as it approaches the articles, then while engaged with the articles to move in the direction of the travel of the articles exactly the same velocity as that of the articles, and then to leave the articles at a progressively changing rotational speed until it again assumes its normal rotational speed.

Figure 4:
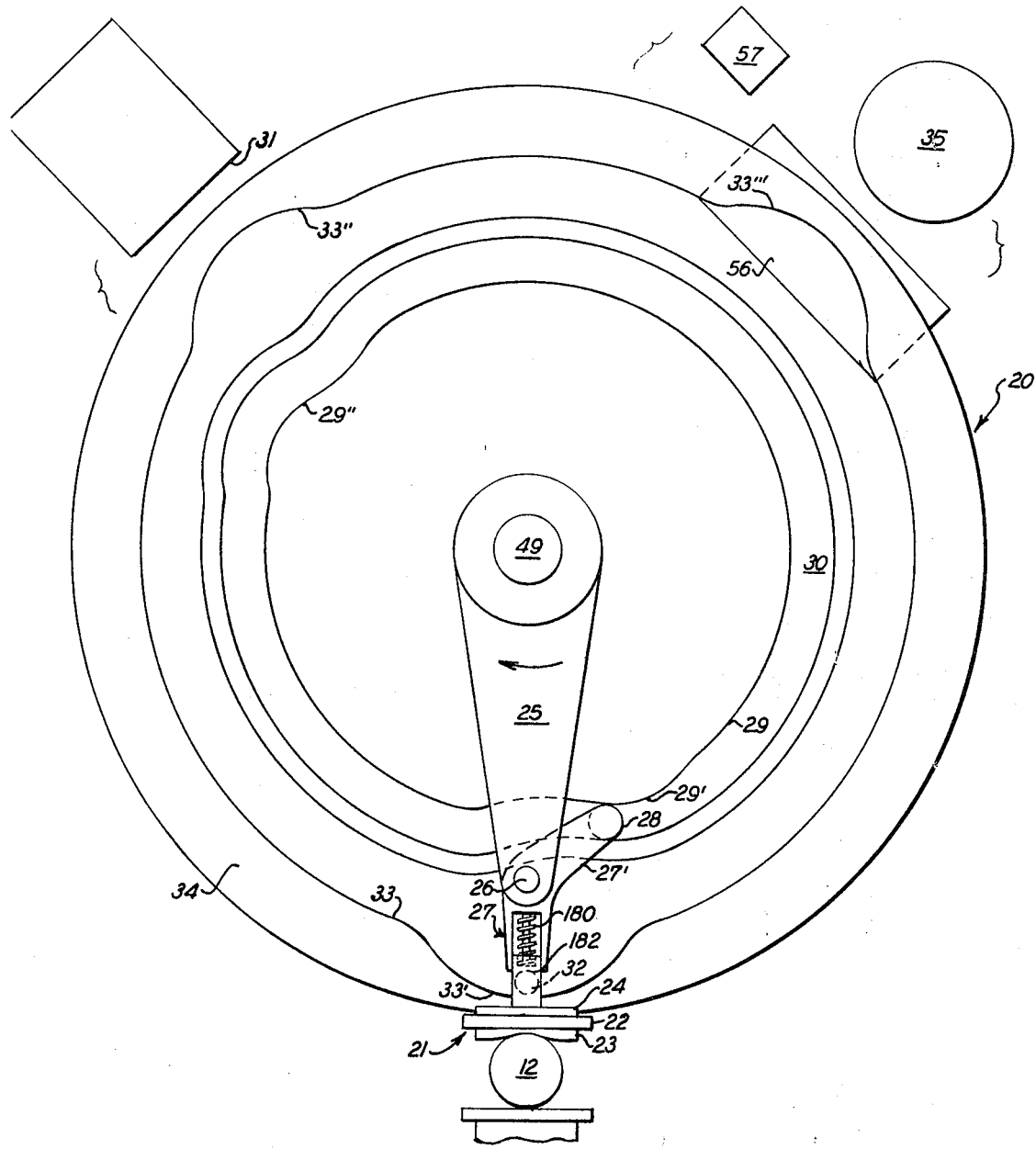
FIG. 4 is a diagrammatic view showing in a simplified form, the method of articulating the label applicator in relation to the glue applicator and an article to be labeled.

The labeling station 13 may be provided with one label applying drum for applying one label to each article, or may be provided with two label applying drums such as the drums 19, 20 shown in FIG. 1 of the drawings to enable the application of two labels simultaneously to each article, or to enable the production of the machine to be doubled as will be hereinafter explained. The two drums 19 and 20 of the machine depicted in the drawings rotate in opposite directions as indicated by the arrows and are adjustable relative to each other to accommodate different rigid articles. As both of the drums 19, 20 are of similar construction, it is believed only necessary to give a description of one of them to provide an adequate understanding of the construction of both. Further, FIG. 4 of the drawings shows a simplified version of the construction of one of the label applicators and the associated part of a drum for purposes of providing a clearer understanding of such construction, whereas FIG. 7 of the drawings shows the actual construction of the same parts of the machine. In both FIGS. 4 and 7 the same reference characters have been applied to equivalent parts so that the same description will apply to both figures unless specifically distinguished.

Figure 7:
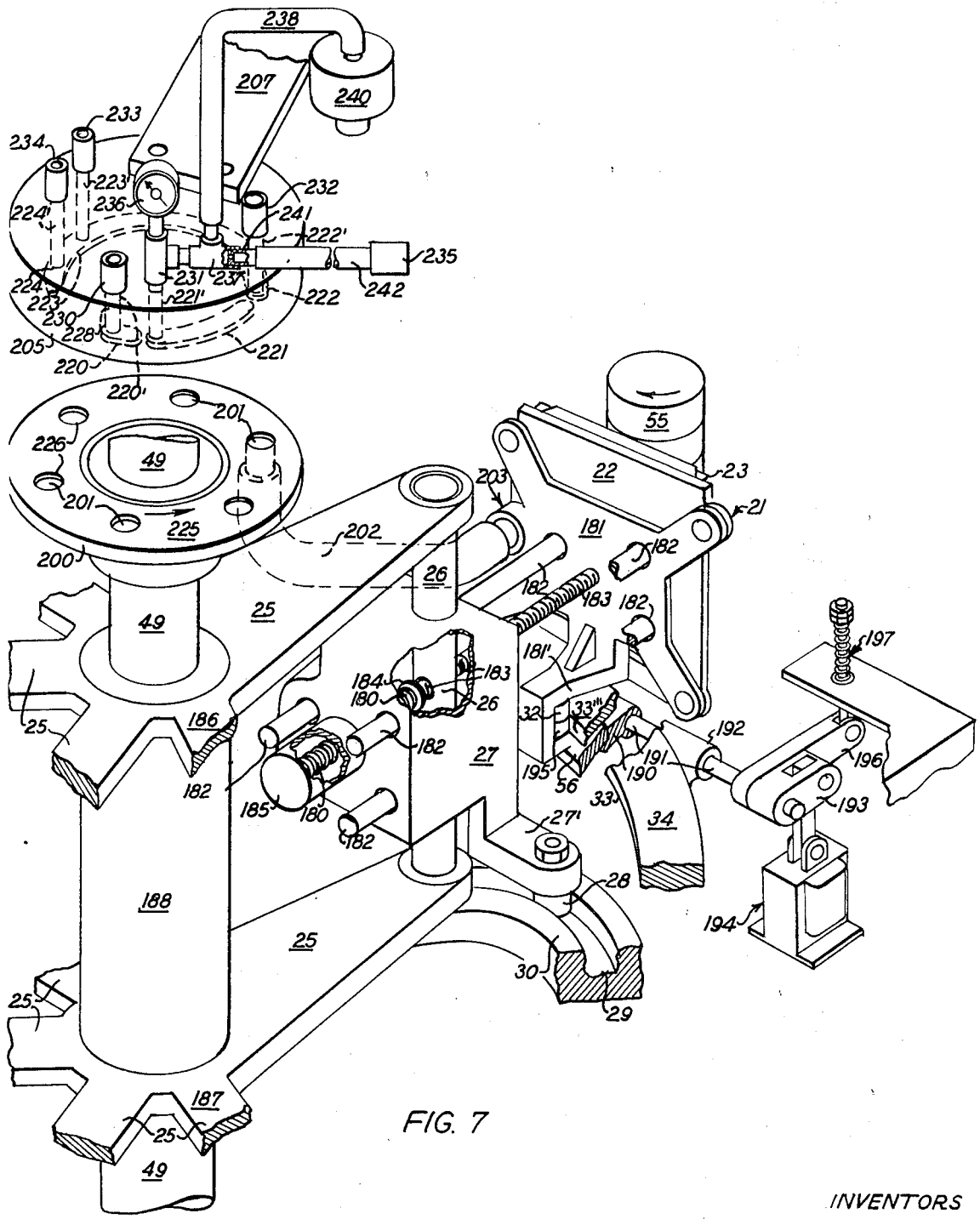
FIG. 7 is an enlarged, partial, perspective view, partly in section, showing in detail the construction of one of the labeling drums.

Referring now to FIGS. 1, 2, 4, 5 and 7 of the drawings, each drum includes a plurality of label applicators generally designated 21 and each of which is composed of a flat, metal, hollow suction plate 22 connected to a suitable source of vacuum and faced by a flat rubber perforated layer 23 which supports the label and enables the applicator to apply the label to the article with a resilient force. Each applicator 21 is carried on a slide 24 slidably mounted on a member 27 for movement in directions radially of the longitudinal axis of a vertical shaft 26 rotatably connected at its ends to the outer ends of a pair of vertically spaced arms 25. The slide 24 is normally biased outwardly by a spring 180. As is shown in FIG. 7 of the drawings, the slide 24 is constituted of an irregularly-shaped vertically disposed plate 181 to which is secured as by bolts the vacuum plate 22 of the applicator 21. The plate 181 has secured thereto three slide bars 182 which slidably extend through passages in the member 27 which is in the form of a metal block. The plate 181 is also provided with a centrally located threaded member 183 which extends through a passage provided through the block member 27 and the shaft 26 to which such block member is secured, and has threaded on its free end a seat 184 for one end of the spring 180. The other end of the spring 180 is seated against the rear wall of a housing 185 secured to the block member 27. It will thus be seen that the slide 24 and consequently the applicator 21 are slidably supported by the block member 27 and slide 24 is normally biased outwardly away from the axis of shaft 26 by the action of the compression spring 180 on the threaded member 183 of such slide 24. The block member 27 in turn is supported by the shaft 26 for pivotal movement about the axis of such shaft. The arms 25, 25 supporting the shaft 26, each constitute one of six integrally connected arms 25 which form what may be termed the top and bottom walls 186, 187, respectively, of the applicator drum and which are joined together by a central annular part 188 mounted on shaft 49 (note FIG. 2 which diagrammatically shows the drum designated 19 in circular form).

Figure 5:
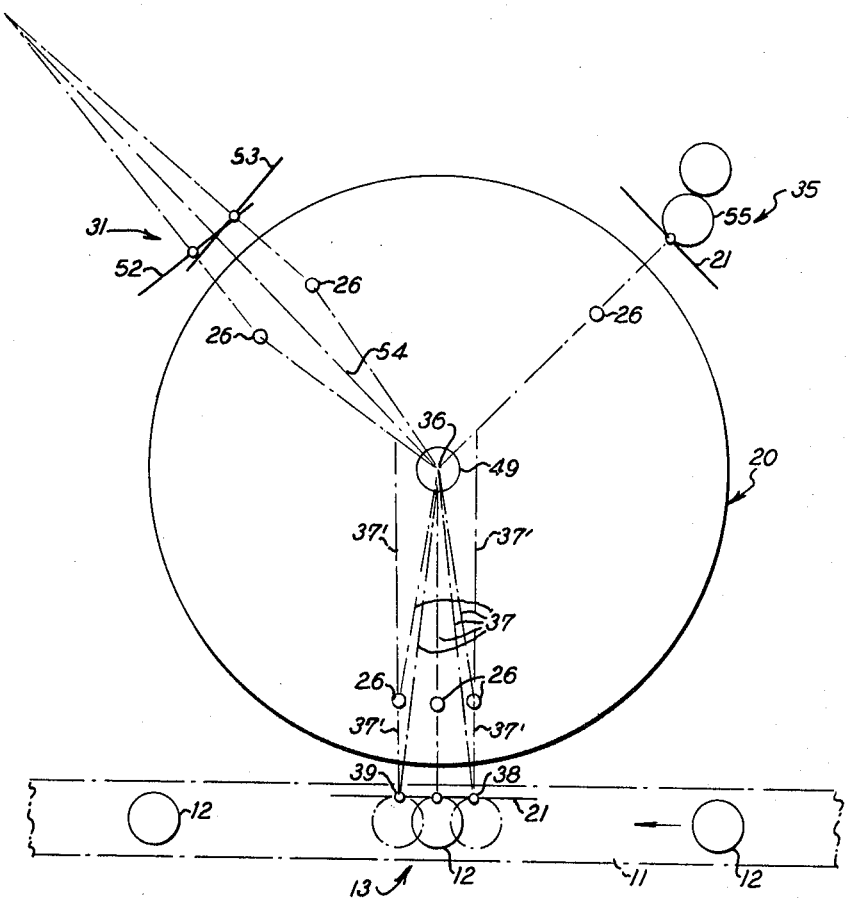
FIG. 5 is a diagrammatic view showing the relationship of a radial line through a fixed pivot point relative to which the label applicator moves and a perpendicular line to the label applicator, while the label applicator passes through the several stations.

The block member 27 has integrally formed therewith an arm 27' which carries a cam roller 28 in engagement with a cam track 29 provided in a fixed circular cam 30 secured to the frame of the machine so that its center coincides with the vertical axis of drum shaft 49. The track 29 is so designed that as the rollers 28 of the block members 27 ride around in such track, such members 27 are caused to be moved through pivotal angles or displacements about the axes of their shafts 26 at the label applying station 13 and at the label pickup station 31. No angular displacement of the block members 27 is made at the gluing station 35. Each of the slides 24 also has integrally formed with the plates 181 thereof an arm 181' carrying a cam roller 32 which engages the internal cam surface 33 of a fixed ring cam 34 encircling the circular cam 30. The cam surface 33 is configured to permit an advancement of the slide 24 under the tension of spring 180 at the labeling station 13, the pickup station 31 and the gluing station 35. At the labeling station 13, the two portions 29', 33' of the cam track and cam surface 29, 33, respectively, are so designed that the combined pivotal movement imparted to the block member 27 and advancing movement imparted to the slide 24 thereby, will cause the label applicator 21 to depart from its curved radial movement about the axial center of shaft 49 and assume a straight-line or linear motion parallel to the movement of the articles 12. This combined motion is such that the label applicator 21 moves at the same velocity as the article through a distance of approximately two or three inches, or a quarter of a cycle of the main cam shaft underlying the conveyor 11. As is shown in FIG. 5 of the drawings, which illustrates the motion of the applicators geometrically, when an applicator 21 is approaching the applying station 13, it is disposed at right angles to one of the radii 37 from the axial center 36 of the shaft 49. Shortly before the center of the applicator 21 arrives at the point designated 38, the combined action of the cam track portion 29' and cam surface portion 33' will cause the applicator to pivot about the axis of shaft 26 into parallel relation with the path of movement of the articles. By the time the center of the applicator has arrived at the point 38 it is in such parallel relation with the articles' path of movement. The applicator 21 maintains this parallel relation until it arrives at approximately the point designated 39 when the cam surfaces will again cause it to turn about its pivot point 26 until it assumes a position at right angles to a radius 37. As is indicated in FIG. 5, as a result of the aforesaid movements of the applicator, a perpendicular 37' to the label supporting surface thereof passing through the pivot point 26, will pass from one side of the central axis 36 to the other side of such axes 36 during the movement of the applicator from the point 38 to the point 39. The label carried by the applicator 21 is resiliently pressed against the article at approximately point 38 and such pressure is maintained until approximately the point 39 is reached to assure a positive application of the label to the article. The vacuum to the applicator 21 is broken shortly after its center passes point 38 so that as the applicator center passes point 39 the adhered label remains on the article 12.

Figure 2:
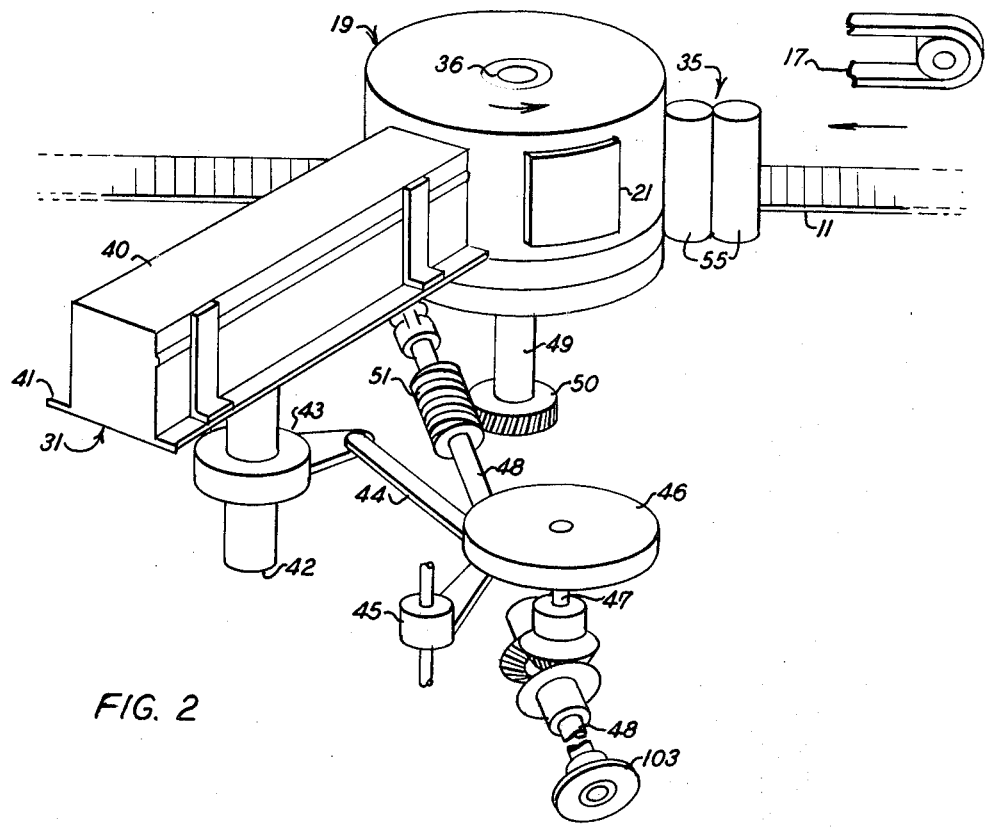
FIG. 2 is a diagrammatic drawing showing in detailed perspective the cam and linkage associated with a label hopper.

At the pickup station 31, a cam track portion 29" and a cam surface portion 33" are so designed that as a result of the combined pivotal movement of the block member 27 and the advancement of the slide 24, the label applicator 21 is caused to follow a portion of the path of the terminal label in the stack 40 of labels carried by the label hopper 41 at such station 31 during the oscillating movement of the label hopper in one direction. As is shown in FIGS. 2 and 9 of the drawings, the label hopper 41 associated with each of the drums 19, 20 is mounted on an oscillating shaft 42 having secured thereto an actuating arm 43 connected by a link 44 to an oscillating cam arm 45 controlled by a cam 46. Cam 46 is mounted on a rotatable shaft 47 geared to a transverse shaft 48 connected to the main drive shaft which extends in parallelism with the conveyor 11. The drum, which in the showing of FIG. 2 is the label drum 19, is mounted on a vertical shaft 49 whose longitudinal axis contains the axial point 36 and is connected by a worm wheel 50 and worm 51 to shaft 48. As a result of this construction the movements of the label drum and the hopper 41 are in locked relation so that as the hopper makes one complete oscillation about its shaft 42, the drum will rotate one-sixth of a revolution about its shaft 49, assuming that the drum is constituted of six applicators 21 as indicated in FIG. 1 of the drawings. The aforesaid movement of an applicator 21 relative to the terminal label in the stack 40 takes place during the advancing movement of the hopper 41 in the direction of the drum rotation as indicated by the arrows in FIGS. 1 and 2. As is shown in FIG. 5 of the drawings, during this advancing movement of the hopper, the terminal label in the stack 40 will assume the positions indicated by the lines designated 52, 53 as it approaches and passes beyond a line 54 which connects the axial centers of the shafts 42, 49; such movement of the terminal label from the position indicated by line 52 to that of line 53 being a progressive one. The cam track portion 29″ and the cam surface portion 33″ are so designed that during such travel of the terminal label between the positions indicated by the lines 52, 53, the applicator 21 will be in parallel, contacting relation with such terminal label and will move at the same velocity as such terminal label. As the applicator passes the place of initial contact designated by the line 52, it is again connected to the vacuum system, assuming that there is an article in proper position on the conveyor 11 so that it will arrive at the applying station 13 simultaneously with the terminal label being contacted. Accordingly, when the applicator moves toward the position indicated by the line 53, it will strip the terminal label from the stack 40.

At the gluing station 35 there is provided any suitable adhesive means for applying glue to the labels, or activating by means of heat, as in the form of a hot gas jet, a layer of adhesive material already provided on the labels. In FIGS. 1 and 2 of the drawing the adhesive applying means is shown composed of a pair of glue rolls 55 which are located in spaced relation to the applicator drum so as to apply glue to the labels carried by the applicators 21 during the rotational movement of such drum. In the region of the gluing station 35, the portion 33‴ of cam surface 33 is configured to permit movement of an applicator slide 24 in such a manner as to cause the outer layer 23 of an applicator 21 to move into substantial tangency with the glue applying roll and to maintain such tangency throughout the width of the label. In such region, the cam track 29 is configured so as not to effect the movements of the applicator, whereby the applicator is maintained at right angles to a radius of the drum during such movement toward the glue roll. Located in the area defined by the cam surface 33‴, is a latch 56 in FIG. 4 which normally is withdrawn so as not to effect the action of such cam surface portion, but which is advanced into the region defined by the latter to prevent the cam roller 32 from engaging such cam surface portion when a label has not been transferred to an applicator 21 at the pickup station 31. The movements of the latch 56 are controlled by a solenoid that is in turn controlled by a vacuum switch 57 shown diagrammatically in FIG. 4 and contained in the vacuum system of the machine so as to be operable when the vacuum in such system is lowered due to the absence of a label on an applicator 21 moving from the pickup station 31, to cause the advancement of the latch 56. As shown in FIG. 7 of the drawings, the latch 56 is carried by an arm 190 connected to a shaft 191 rotatably supported by a frame bearing 192. The shaft 191 is connected by an arm 193 to the armature of a solenoid 194 so that on energization of the latter, the shaft will be pivoted to raise the latch 56 into a position in which it will be engaged by a roller 195 paired with the approaching cam roller 32 of the applicator riding cam surface 33, and thereby prevent such cam roller 32 following the portion 33‴ of such cam surface as the applicator moves into the region of the gluing station 35. The shaft 191 is provided with a third arm 196 whose outer end is connected with a spring assembly generally designated 197 and operable to cause the shaft to rotate to retract latch 56 on deenergization of the solenoid 194. When a heating jet of gas is used to activate adhesive material on the labels, the vacuum switch 57 may be connected to and control the operation of the valve controlling such jet, so that the jet is cut off when a label is not transferred to the applicator 21 at the pickup station 31.

The labeled articles pass from the label applying station 13 to the pressure station 18 at which is positioned a pair of pressing devices located on opposite sides of the conveyor 11 and operable toward and away from the articles on the conveyor. As will be observed in FIGS. 1 and 3 of the drawings, each of the pressing devices may comprise a beam 60 supporting a plurality of pressing devices which may be arranged in groups of different constructions. For example, as is shown in the drawings, the pressing devices may be composed of a pair of devices 61, 61 having article contacting heads 62, 62 made of blocks of sponge rubber, and a pair of devices 63, 63 having article contacting heads made of arcuately-shaped blocks 64, 64. With such a construction two labeled articles will be initially engaged by the heads 62, 62 on one cycle of movement of the beams 60, and will then engage with the blocks 64, 64 on the following cycle of the beams 60. The heads 62, 62 secure more firmly the central portions of the labels to the articles, and blocks 64, 64 complete the attachment of the labels to the articles.

Figure 3:
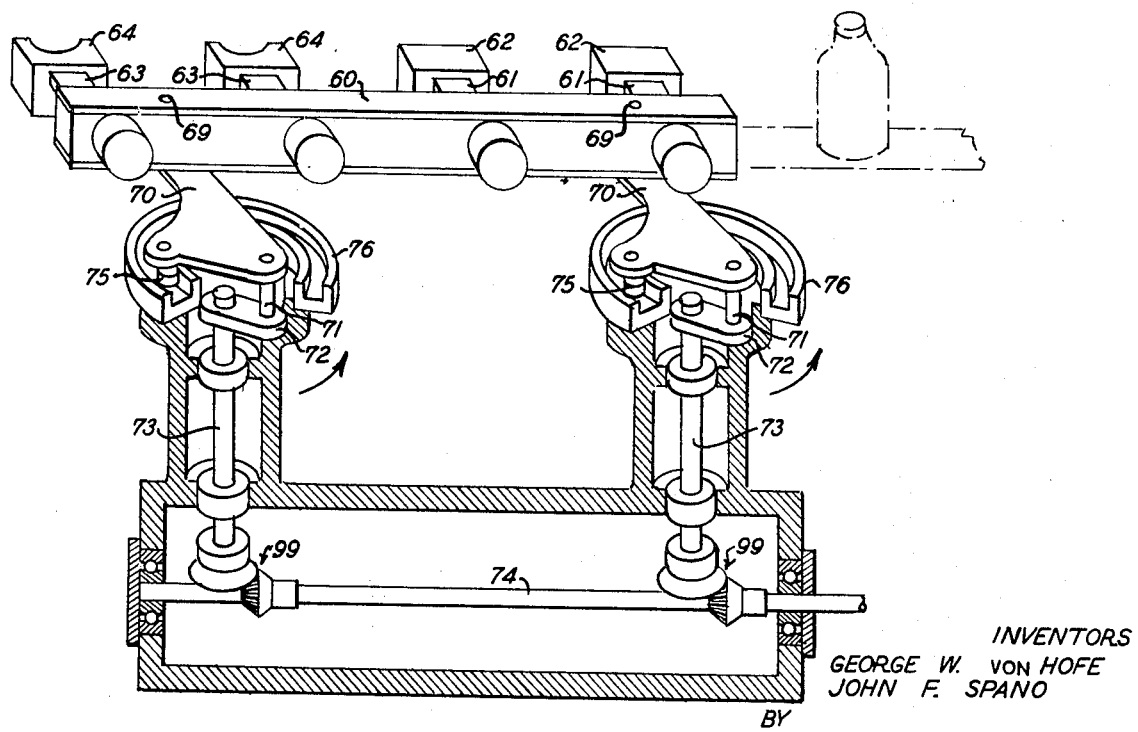
FIG. 3 is a diagrammatic view showing in detailed perspective the cam and linkage construction employed at the pressure station.

The two pressing devices are of similar construction and accordingly it is believed only necessary to illustrate in detail the actuating mechanism of one of such devices. As is shown in FIG. 3 of the drawings the beam 60 of each such device is carried and actuated by a pair of cranks 70, 70 which are connected at one end thereof by pins 69, 69 (FIG. 1) to such beam. The cranks 70, 70 are pivotally mounted at their other ends on pins 71, 71 provided on arms 72, 72 secured to rotatable shafts 73, 73 connected in driven relation at their lower ends to a driving shaft 74 (note also FIG. 9). Intermediate their ends, the cranks 70, 70 are provided with cam followers 75, 75 which engage cam tracks 76, 76. It will be understood that as a result of this construction, the continuously rotating shafts 73, 73 will rotate the arms 72, 72 to cause the pins 71, 71 to rotate around such shafts. During such rotational movement of the pins 71, 71 the cam followers 75, 75 are forced to advance in the tracks 76, 76 in the direction of the arrows. The cam tracks are constructed so that they may cause an addition or a subtraction of increments of angular velocity in the oscillating movements of the cranks 70, 70 about the pins 71, 71; which increments are initiated and terminated slightly before and after the periods in which the heads 62, 62 and the blocks 64, 64 come into engagement with and moved away from the articles. The cam tracks are so designed that in such periods, that component of the velocity of the heads 62, 62 and blocks 64, 64 in the direction of travel of the articles will be exactly the same as the velocity of the articles.

As is indicated in FIG. 9 of the drawings, the above discussed mechanisms are operated from a main shaft 80 which extends the length of the machine beneath the conveyor 11. At the entry end of the machine, one end portion 79 of the main shaft 80 is provided with a heavy flywheel 81 capable of maintaining the aforesaid mechanisms operating while the machine is in use. Shaft 80 is continuously driven at a rate of three revolutions per cycle of operation of the machine, by an electric motor 82 which is connected thereto by a belt 84 coupling its drive wheel 83 to the flywheel 81. The body portion of shaft 80 is connected in driven relation to the motor 82 by an electric clutch 85 having associated therewith an electric brake 86, such two devices being so combined in a known manner that when the clutch 85 is operated to disengage the end shaft portion 79 from the body portion of shaft 80, the brake 86 will be simultaneously applied to such shaft body portion to stop rotational movement of the latter. It will be noted however, that although the main shaft 80 is braked to a stop, the motor 82 will continue to rotate the end shaft portion 79.

Provided on shaft portion 79 is a sprocket wheel 87 which is connected in driving relation to a sprocket wheel 88 mounted on one end of a shaft 89 arranged parallelly to main shaft 80. The other end of shaft 89 is connected by gearing 92 to a transverse shaft 90 which in turn is connected at its ends by gearing 91, 91 to the drive shafts for the glue rolls 55 at the glue applying stations 35, 35 and for the glue pumps for feeding glue to such glue rolls in a manner known to the art. It will be seen therefore, that although the operating mechanisms of the machine may be stopped by disconnecting the clutch 85 and applying the electric brake 86 to the main shaft 80, the glue rolls and associated pumps will be continuously driven, thereby avoiding the disadvantages usually resulting from an intermittent operation of the glue apparatus.

The main shaft 80 is connected through the main gear box 95 which includes speed reducer gearing, to a transverse shaft 96 which at its ends is connected by gearing 97, 97 to the two vertical drive shafts 98, 98 of the registering device 15. The gearing 97, 97 also connects shaft 96 to two lengthwise shafts 74, 74 which extend in parallelism to the main shaft 80 and each of which is connected by gearing 99, 99 to the two vertical shafts 73, 73 of each of the two opposed pressing devices at the pressure station 18.

Secured to shaft 80 between the shafts 90 and 96 is a drive sprocket wheel 108 which is chain connected to a sprocket wheel 109 provided on one end of a shaft 110 arranged in parallelism to the main shaft 80. The other end of shaft 110 is provided with a sprocket wheel 111 which is connected by a chain to a sprocket wheel 112 for driving the chain of gears 114 connected to the shaft 115 of the feed screw 14. The main shaft 80 is rotated at a rate of three revolutions for each cycle of operation of the machine. The aforesaid parts connecting the feed screw 14 to the main shaft are designed to reduce the rotational rate of the feed screw 14 to one revolution per cycle of operation of the machine, as has been previously indicated.

The main shaft 80 is connected in driving relation to the label applying mechanism through a gear box 100 and the previously referred to transverse shaft 48 which is disposed in parallelism with the transverse shafts 90 and 96. On each side of the gear box 100, shaft 48 is provided with an adjustable coupling 101 whereby the length of such shaft and consequently the distance between the label applying drums 19, 20 may be varied to accommodate articles of varying sizes. As previously described, shaft 48 is provided on each portion thereof extending from the gear box 100, with a worm 51 which engages a worm wheel 50 provided on the lower end of a vertical shaft 49 carrying one of the drums 19, 20 (note FIG. 2). As indicated in dotted lines in FIG. 9, the forward shaft 49 as viewed in such figure, carries the drum 19 and the other or rear shaft 49 carries the drum 20. The end portions of shaft 48 are provided with gearing 102 which connect it to the vertical shafts 47 on which are mounted the cams 46 for oscillating the label hoppers 41 associated with the drums 19 and 20. The cams 46 are each connected by a link 44 to an actuating arm 43 to the shaft 42 on which the label hopper is mounted (note FIG. 2). Each terminal end of the transverse shaft 48 is provided with a hand wheel 103 by which the machine may be manually turned.

The shaft 80 terminates at its other end in a gear box 118 and is connected by the latter to a transverse shaft provided with a sprocket wheel 119. The wheel 119 is chain connected to a sprocket wheel 120 mounted on a transverse shaft carrying the end drive wheel 121 for the conveyor 11 so that such wheel is located in alignment with shaft 80. The other end wheel 122 of the conveyor (in FIG. 1) is a freely rotating wheel. Adjacently to the gear box 118, shaft 80 is provided with a sprocket wheel 125 which is chain connected to a sprocket wheel 126 mounted on the drive shaft of a gear box 127. The driven shaft of the gear box 127, marked 124 in FIG. 9, is suitably connected to the drive wheel 129 of the pressure belt 17. The sprocket wheel 125 is also connected by the chain drive to a sprocket wheel 130 mounted on a shaft 131 carrying the microswitch cams 132, 133 and 134 and the timing disc 135 which control the timing of the operations of the several instrumentalities.

Figure 8:
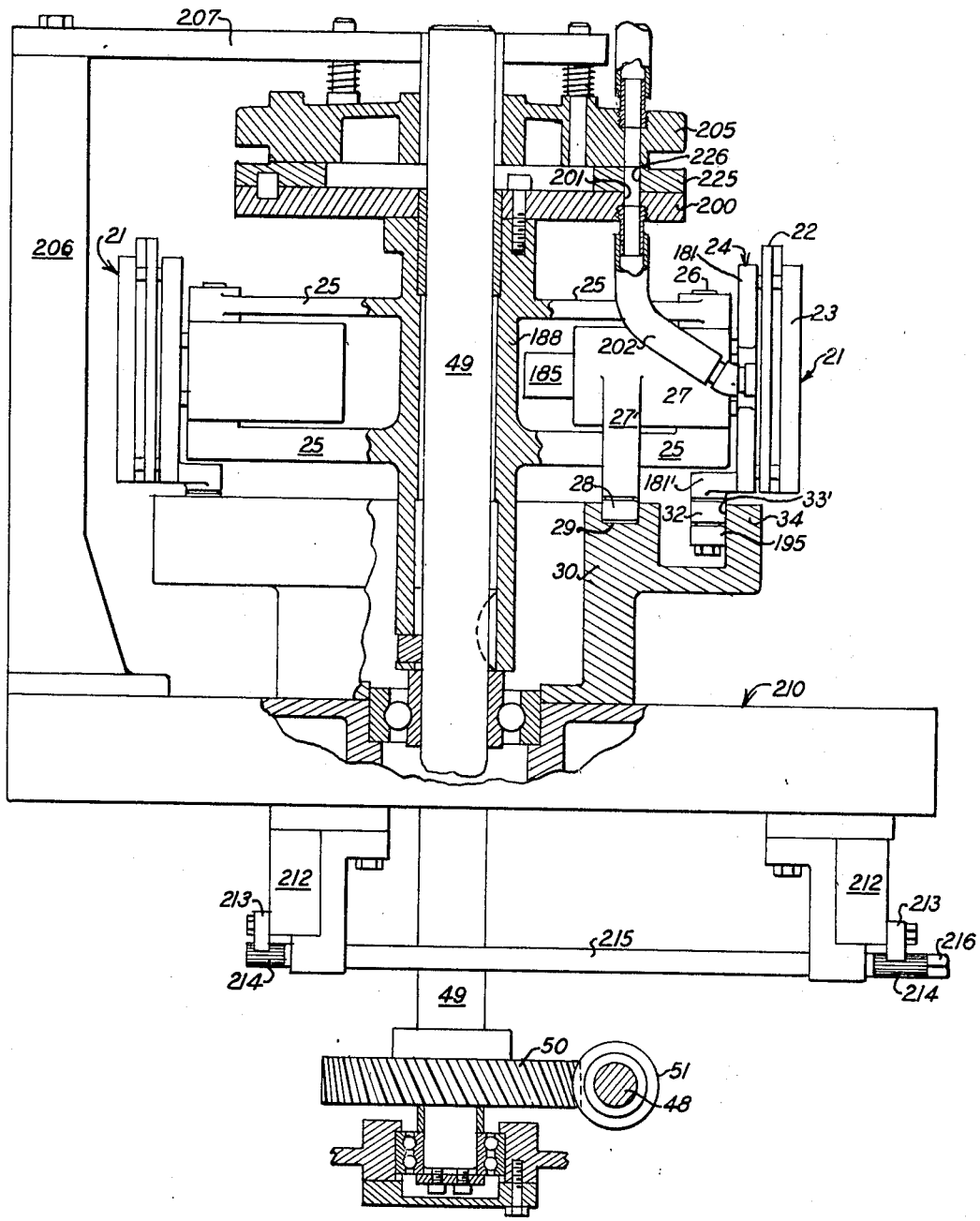
FIG. 8 is a vertical sectional view of one of the labeling drums.

Referring now to FIGS. 7 and 8 of the drawings, it will be observed that the shafts 49 associated with the drums 19, 20 are rotatably supported by tables 210, 211 respectively, (note also FIG. 1) beneath each of which is located the worm drive 50, 51 associated with each such shaft 49. Each of the tables 210, 211 are slidably carried on the outer ends of two transverse bars 212, 212 which are disposed in spaced parallel relation and which are fixedly mounted on the frame of the machine so that the tables 210, 211 can be adjusted toward and away from each other to enable the drums 19, 20 to operate on articles of widely varying sizes. The outer ends of the bars 212 associated with each table have secured thereto rack bars 213 which engage with pinions 214 formed on a rod 215 extending across and rotatably supported by the outer end of the table. One end 216 of the rod 215 is squared to enable it to be engaged by a suitable crank (not shown) to turn the rod 215 in one direction or the other to move the table inwardly or outwardly to provide the proper distance between the two drums. As shown in FIG. 9 the two adjustable couplings 101, 101 on shaft 48 enable such adjustment of the tables to be readily made without distributing the drive for the drums 19 and 20.

Secured to each shaft 49 above the drum thereon is a circular plate 200 provided with six ports 201, one for each of the applicators 21. The lower or discharge ends of the ports 201 are provided with suitable nipples for connecting to such ports one end of six hose lengths 202, the other ends of which are each suitably connected to the vacuum plate 22 of one of the applicators 21, as by the couplings 203 shown in such figures.

Superimposed on the rotatable plate 200 is a fixed plate 205 supported on the associated table 210, or 211 by a bracket arm 207 provided at the upper end of a standard 206 mounted on the table. Formed in the undersurface of the plate 205 are a plurality of circularly arranged spaced recesses 220, 221, 222, 223, and 224 forming chambers on the underside of such plate and with which each of the ports 201 successively come into communication within the rotational movement of the drum. The recesses 220, 221, 222, and 223 are spaced apart a distance less than the diameter of a port 201 so that such ports 201 will span such spaces as they move progressively along the path defined by such recesses. The space between the recesses 223 and 224 however, is greater than the diameter of a port 201 so that there can be no communication between such recesses as the ports 201 move from recess 223 to recess 224. Provided between the plates 200 and 205 and secured to the former so that it rotates therewith is a lubricating ring 225 made of any suitable lubricating material such as graphite or Teflon. The ring 225 is provided with six openings 226 in registration with and of approximately the same diameter as the ports 201 in the plate 200.

The plate 205 is provided with five vertical passageways 220′, 221′, 222′, 223′, and 224′ which communicate at their lower ends with the recesses 220, 221, 222, 223, and 224, respectively, and extend up to the top surface of such plate. Attached to suitable nipples provided at the tops of the passageways 220', 222', 223', and 224' are lengths of air hose 230, 232, 233, and 234, respectively. Air hose 230, 232, and 233 may be directly connected to a suitable source of vacuum, such as the low pressure side of the vacuum pump 235 shown in FIG. 7, while air hose 234 is connected to the high pressure side of such pump so that compressed air is conducted therethrough. Attached to the top of passageway 221 is a pipe T 231 to which is connected a vacuum gauge 236 and one end of a second pipe T 237. The central opening in the pipe T 237 is connected by a hose 238 to a vacuum switch 240. The other end of the pipe T 237 is connected through a vacuum orifice 241 and hose 242 to the low pressure side of the pump 235. It will thus be seen that the chamber formed by recess 224 will be supplied by air pressure, while the chambers formed by recesses 220, 221, 222, and 223 will be under vacuum. The pump 235 is large enough to maintain proper vacuum in recesses 220, 221, 222, and 223 though there are substantial leakages therefrom in the operation of the machine. It will be noted also that the recess 223 is substantially longer than the other recesses and is longer than the length of the distance between successive ports 201, so that two of such ports will periodically come within the area of such recess at the same time. The pump 235 therefore should be large enough to take care of the leakages occurring at recess 223 as a result of its length in the operation of the machine.

The air pressures in the chambers formed by the recesses 220, 221, 222, 223, and 224 are utilized to control the operations of the applicators 21 and such recesses are so arranged on the plate 205 and are of such lengths that such control is exercised successively on each applicator during a cycle of its operation and for given periods during such cycle. Thus the recess 220 is so constructed and arranged that it will furnish vacuum to an applicator during the period that starts as it initially contacts the terminal label in the stack 40 provided on the associated label hopper 41 (indicated by the line 52 in FIG. 5) and continues until such applicator has moved to the position in which it will strip the terminal label from the label stack 40 (indicated by the line 53 in FIG. 5). As the applicator 21 moves toward the gluing station 35 it will be in communication with the chamber formed by recess 221. The vacuum in recess 221 is utilized to control the operation of the latch 56 at the glue applying station 35 through the vacuum switch 240 and the vacuum orifice 241. The vacuum switch 240 is biased to closed condition, but in the normal operation of the machine is maintained in open position by the vacuum maintained in the recess 221 because the labels picked up by the applicators 21 at station 31 will close the suction ports in the label carrying surfaces of such applicators and prevent the entry of atmospheric air into such recess. Vacuum switch 240 controls the operation of solenoid 194 and in the open position thereof will cause such solenoid to be energized and hold the latch 56 withdrawn from its blocking position of the cam surface portion 33'''. When however, a label has not been transferred to an applicator 21 at the pickup station 31, as the port 201 associated with such applicator moves into communication with recess 221, air from the atmosphere will enter into such recess through the uncovered vacuum holes in the label carrying face of the applicator, and cause the vacuum in such recess to drop. Because of the vacuum orifice or restriction 241, this reduction in vacuum will be sensed by the vacuum switch 240 which will then close causing solenoid 194 to become energized and thus move the latch 56 into blocking position relative to the cam surface portion 33'''. As previously mentioned, when this occurs the applicator 21 is prevented from moving into contact with the glue roller 55 as it travels past the same, thereby assuring that no glue will be transferred from such roller to the uncovered label supporting surface of the applicator 21.

During the travel of an applicator 21 through the portion of its path defined by the cam surface portion 33''', its associated port 201 will be in communication with recess 222 and any label carried by such applicator will be securely held thereon by the vacuum provided in such recess. As the applicator 21 travels from the glue station 35 to the label applying station 13 its associated port 201 will be in communication with recess 223 which will provide sufficient vacuum to enable the applicator to carry the label thereon to such station 13. As previously indicated the vacuum from the recess 223 is effective until shortly after the center of the applicator passes the point 38 in FIG. 5. The port 201 of the applicator will then come into communication with the recess 224 from which an air blast will be passed therethrough to positively transfer the label from the applicator to the article as the former is moving in parallel relation to the article's path of movement.

It will be understood from the foregoing that in the normal operation of the machine the motor 82 is continuously running to continuously drive the flywheel 81, the glue rolls 55 and the associated glue pumps. This is accomplished and has been indicated by interposing in the main drive between the aforesaid elements and the remainder of the machine, the electric clutch 85 and brake 86. The brake 86 is deenergized to release the main shaft 80 and the clutch 85 is engaged to couple the flywheel 81 with the main drive of the machine by pressing the start button 250 in FIG. 10. Upon closing switch 250, current flows from the line 251, through the contacts of switch 250 and the closed contacts of the stop button 252, a pressure switch 253, and a series of overload switches 254, 254' and 254'', and through the coil of relay 255 to line 256 which is the other side of the input voltage. On energization of relay 255 its contacts 255' and 255'' are closed allowing electricity to flow from line 256 through the coil of relay 257, the contact 255'' of relay 255, the closed contacts of the emergency stop buttons 258, 258' and jog button 259 to junction 260, and then through the closed contacts 261', of the machine brake release switch 261 to line 251, thereby completing the circuit. When the coil of relay 257 is thus energized, its contacts 257', 257'' are closed thereby enabling current to flow from the rectifier 262 through the electric clutch 85 and back to such rectifier and causing the clutch 85 to engage and the machine to run. When the operator removes his finger from the start button 250, relays 255 and 257 stay energized to feed the desired current to clutch 85; such current flowing from line 256 and through the coil of relay 255, overload switches 254, 254' and 254'', the closed contacts of pressure switch 253 and stop button 252, junction 263, the contact 255' of relay 255, junction 264, the closed contacts of the emergency stop push buttons 258, 258', the closed jog button 259 to junction 260, and then through the closed contacts 261' of the machine brake release switch 261 to line 251.

Figure 10:
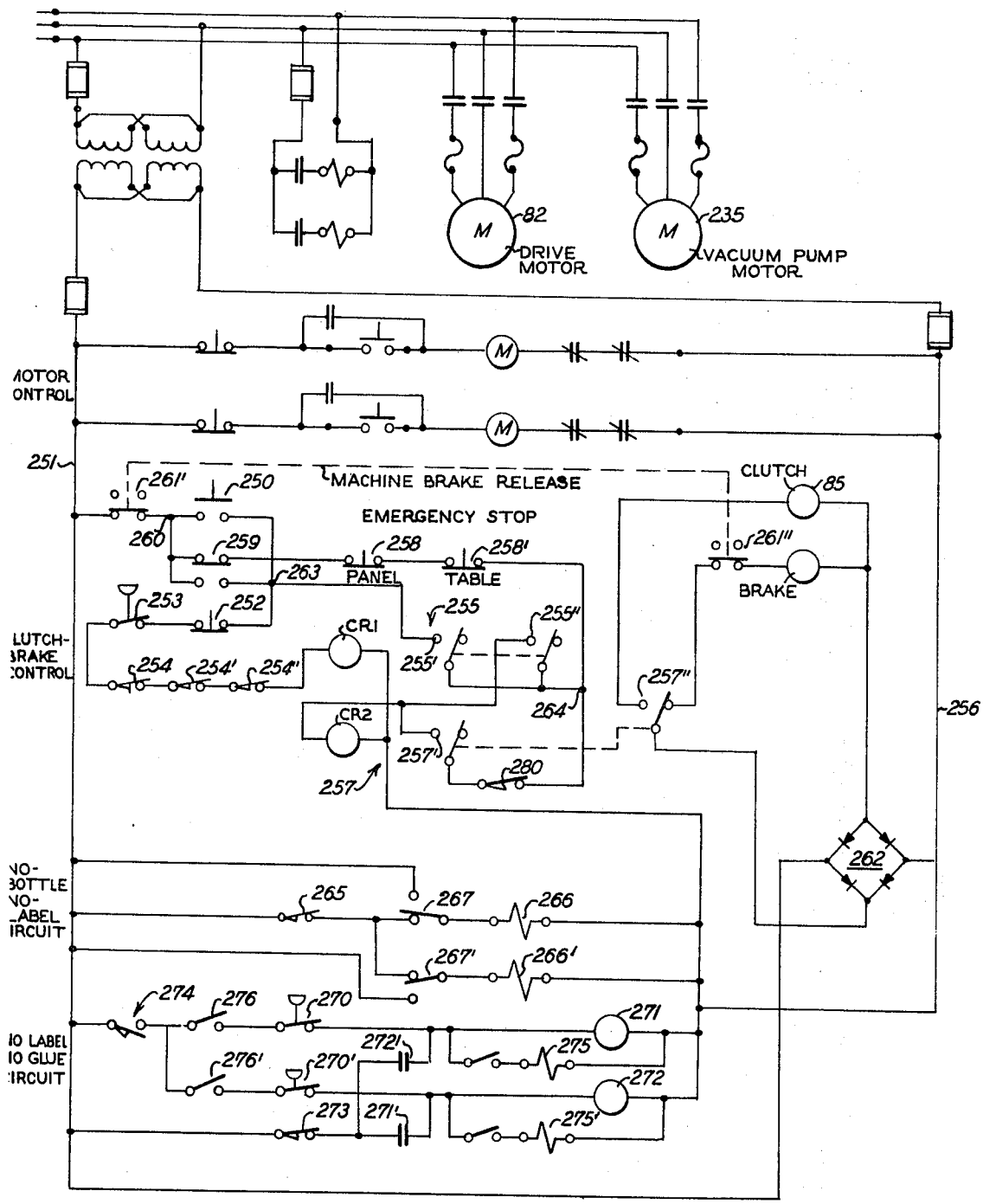
FIG. 10 is a schematic drawing illustrating the essential features of the several circuits of the machine.

With the machine running, the previously described instrumentalities operate to perform the functions of the machine. Thus as an article 12 is fed into the machine by the conveyor 11, it is engaged by the feed screw 14 which times it for engagement by the centralizing jaws 16, 16' of the registering device 15. The jaws 16, 16' of the registering device 15 readjust the position of the article 12 on the conveyor 11 so that it will come into accurate registry with the label to be applied thereto by a label applicator 21 without interrupting its feed by the conveyor. As the article is progressing through the feed screw 14, it trips a limit switch 265 which as is shown in FIG. 1, is located adjacently to the article's path of travel through the machine so that its actuating lever is moved by the article. When so moved, switch 265, as is shown in FIG. 10, causes either of the electrically operated solenoid valves 166, 166', or both, depending on which of the drums 19, 20, or both, respectively, are supplying labels to the articles 12, to be deenergized. When a valve 166, 166' is deenergized, it opens and brings the hose 230 connected to the port 220 at the label pickup station 31, into communication with the vacuum pump 235, thereby enabling an applicator 21 approaching such station to remove the terminal label from the stack 40 in hopper 41. The switch 265 is so placed along the article path that it is actuated when the applicator 21 which is to carry its particular label is about to enter the hopper 41. As a result of this arrangement, suction will be created in an applicator 21 while it is in the label hopper only when there is an article for the then terminal label in the stack 40. Switches 267, 267' associated with the valves 266, 266', respectively, are single pole double throw switches which may be selectively operated to short out the action of the article switch 265. Thus, by closing either of switches 267, 267' the vacuum connection to one of the drums 19, 20 can be rendered inoperative so that the other drum can be operated without having such one drum attempt to pick up labels from its associated label hopper.

After an applicator 21 picks up a label at station 31, the port 201 associated therewith comes into communication with and moves along the chamber or port defined by recess 221. The port 221 in each of the plates 205 mounted on the drums 19, 20 has associated with it a vacuum operated switch 270 or 270' in FIG. 10. The switches 270, 270' are normally closed when there is no vacuum present in the ports 221. In the vacuum line connecting each port 221 and its associated switch 270 or 270' to the vacuum source 235, is a restricted orifice 241 which is small enough to permit only normal leakage through the label and applicator connections, to flow into the vacuum system. Consequently, when there is a label on the applicator 21 traveling from the pickup station 31 to the glue applying station 35, the suction in its associated index port 221 will increase and open the contacts of switch 270, or 270', while when there is no label on such indicator such contacts will close. The opening of switch 270 or 270' would deenergize the coil of its associated relay 271 or 272, respectively, excepting that in the case where there is no label on the applicator 21 preceding the one discussed, such coil would still get power through the closed contact 272' of relay 272, or 271' of relay 271, respectively, and the closed limit switch 273 which is operated by the cam 133 in FIG. 9. Normally however, when the preceding applicator is also provided with a label, and as the trailing edge of such label is breaking contact with the glue roll 55, a normally open limit switch 274 which is operated by the cam 132 in FIG. 9, closes. Cam 133 then opens switch 273. As switches 270 and 270' are both open due to the presence of labels on the associated applicators and limit switch 273 is open, relays 271, 272, will be denergized thereby opening contacts 271' and 272' of relays 271 and 272, respectively. Switch 273 is then allowed to close by its associated cam 133. The cam 132 which operates limit switch 274, then allows the latter to open as the roller 32 associated with the slide 24 of the applicator approaches the cam surface portion 33''' adjacent to the adhesive station 35. Because the contacts 271' and 272' are both open, the solenoids 194 associated with both drums for pulling the latches 56 into blocking relation in the cam surface portions 33''', are deenergized, the spring mechanisms 197 associated therewith will keep the latches retracted. As there is no obstruction of the cam surface portions 33''', the associated applicators can move the labels carried thereby to and across the glue rolls 55 to have applied thereto coatings of glue from such rolls. At the same time, the solenoid valves 275, 275' being also deenergized, will connect the chambers or ports formed by recesses 222 in the plates 205 associated with the drums 19, 20, with the vacuum source 235 so that vacuum is applied to the labels on the applicators while they are in contact with the glue rolls 55.

The above described conditions will prevail so long as labels are being successively picked up by the applicator 21 at the pickup station 31. When however, an applicator 21 for some reason does not carry a label away with it from its associated pickup station 31, the vacuum switch 270 or 270' associated with such applicator will close. Subsequently, when cam 132 closes limit switch 274 after the preceding applicator has passed the glue roll 55, relay 271 or 272, respectively, will be energized to close its contacts 271' or 272', respectively, thereby energizing relay 272 or 271, respectively, to close its contacts 272' or 271', respectively. The solenoids 194 associated with such applicators will consequently be energized and move the associated latches 56 into blocking position to prevent the applicators in both drums from moving into contact with the glue roll 55. Simultaneously the applicators will be cut off from the vacuum source 237 as they cross the area of glue application by the energization of the associated electrically operated valves 275, 275'. When the labels are coated with heat activatable adhesive material, and heated air jets are substituted for the glue rolls at the stations 35 to activate such coated material, a pair of electrically operated valves similar to the valves 275, 275' placed electrically in parallel with each other will shut off the air pressure which supplies the heated air to activate such coated material, when the applicator fails to carry away a label from the pickup station 31.

It will be understood that as a result of the above described construction, the applicators will be prevented from coming into contact with the glue rolls whenever they fail for any reason whatsoever to carry a label away from the pickup station 31. Further, since there is no suction applied to an applicator that failed to pick up a label, as it passes the glue roll, any fine particles of glue that permeate the atmosphere in the region of the glue rolls, will not be sucked into the vacuum system of such applicator. Consequently, the danger of such particles building up in the system until they clog the same is avoided.

It will also be understood that when both drums 19 and 20 are operating simultaneously to apply front and back labels to articles, and one of the applicators fail to pick up either a front label, or a back label, the circuit arrangement is such that both of the paired applicators for the front and back labels will be prevented from moving toward the glue rolls. In such a situation, the applicator that has picked up a back or front label will fail to hold the same because both applicators will have been cut off from the source of vacuum. Since neither applicator has a label adhered thereto, and both have been prevented from coming into contact with the glue rolls, the article will not have adhered thereto either of such labels, nor will it have applied thereto to a film of glue from the applicators. The article that would have been labeled can therefore be rerouted through the machine without the necessity of it being washed to remove either a label or a glue mark left thereon by one of the applicators.

It will also be noted that associated with the vacuum switches 270, 270' are single pole, single throw switches 276, 276' which, when open, simulate the presence of labels on the paired applicators. On a two sided machine such as illustrated, both switches 276, 276' are closed while running front and back labels. When labels are to be applied to one side only of the articles, that switch 276, 276' which is on the side of the machine that is not to function is opened.

After the applicators 21 move past the gluing stations 35, they carry the glued labels to the applying station 13. Vacuum during this portion of the travel of the applicators is furnished to their vacuum plates 22 from the chambers 223 in the plates 205. As the paired applicators and the article approach each other at station 13, the applicators are caused to twist relative to their pivot shafts 26 so that the planes of the surfaces of the rubber layers 23 thereof carrying the glued labels are parallel to the direction of article travel, and to move toward the article so as to apply the labels carried thereby to the article under pressure. The resultant of the twisting and advancing motions of the applicators is a velocity identical with that of the article in the direction of its travel for a period approximating 60° of the cycle time. Thus, the applicators actually squeeze the labels against the article for a given maintained period sufficient to assure good glue adhesion to the article. While the applicators are exerting this squeezing action on the article, the soft rubber label carrying layers 23 thereof, permit greater areas of adhesion especially in the case of articles provided with curved or tapered label carrying surfaces. The connection of the vacuum plates 22 of the applicators to the vacuum chambers or ports 223 is discontinued while the applicators are squeezing the labels against the articles, thus assuring accuracy of registration between the labels and the article during the transfer of the labels. The vacuum plates 22 of the paired applicators are next brought into communiaction with the recess or port 224 in the plates 205 from which compressed air is delivered to blow through the applicators while they clamp the labels against the articles. The additional pressure furnished by the compressed air increases the areas of adhesion between the labels and the article especially if the label carrying surfaces thereof are round, tapered or odd-shaped. As the drums 19 and 20 continue their rotative movements the paired applicators retract from contact with the article and the latter advances to the pressure or wiping station 18 where the application of the labels to the articles are completed in the manner previously described.

As previously indicated the machine may be stopped by disengaging the electric clutch 85 and applying the electric brake 86 which locks the main drive shaft 80 to the frame of the machine so that it can no longer turn, thereby quickly bringing the machine to a stop. If the stop is a normal one as when shutting down for a desired period, the machine preferably is stopped in that part of its cycle where the paired applicators 21 have just cleared the glue rolls 55 and just before the following paired applicators contact the glue rolls. This normal stopping is accomplished by pushing the stop button 252 to open its contacts and thereby interrupting the flow of current through the coil of the relay 255 to cause its contacts to be actuated to swing to the open positions shown in FIG. 10 of the drawings. This leaves as the only path of current for maintaining relay 257 energized, the path which goes from line 256 to the coil of relay 257 and through its contact 257' to the normally closed limit switch 280, through the junction 264, the emergency stop push buttons 258, 258', the jog button 259 and the machine brake release switch 261 to line 251. The operation of limit switch 280 is controlled by cam 134 in FIG. 9 which is constructed to open limit switch 280 during the interval just after the paired applicators 21 leave the glue rolls 55 and before the following paired applicators contact such glue rolls. Thus when limit switch 280 opens, the coil of relay 257 is deenergized, and its contacts move to open position to break the flow of current in the electric clutch 85 and create a flow of current in the electric brake 86. It will thus be seen that by pressing the stop switch regardless of the part of the cycle in which it may be actuated, the machine will always stop in the given timed position described.

The machine may also be stopped instantly as in the case of an emergency by depressing either of the emergency stop buttons 258, 258'. The actuation of either of these buttons causes the flow of current through the coils of both relays 255, 257 to be immediately broken thereby causing the contacts thereof to move to the open positions shown in FIG. 10 of the drawings so that the current cannot be reestablished in the coils of either relay 255 or 257. The contact in relay 257 which moves from 257" to open position shifts the power from the clutch to the brake thus stopping the machine immediately.

Figure 11:
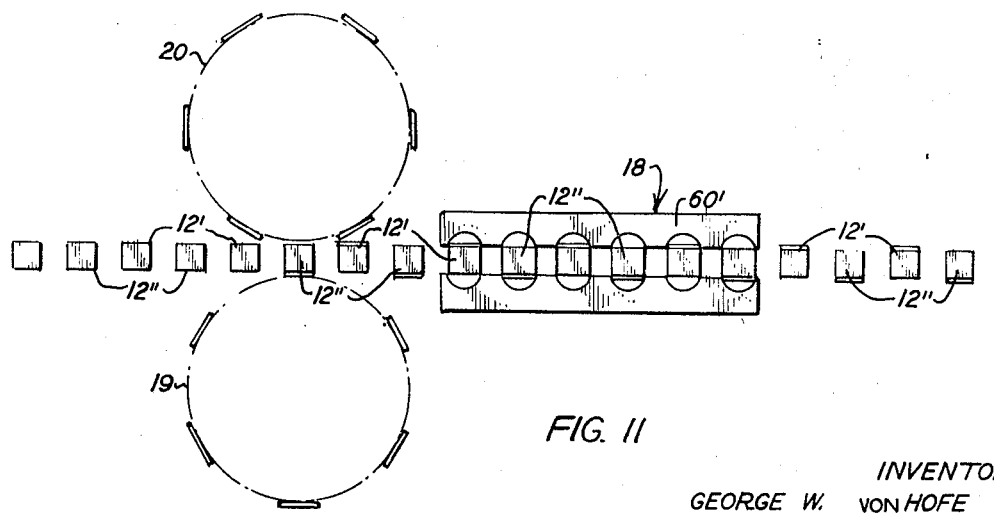
FIG. 11 is a diagrammatic drawing showing in plan view how the drums may be operated out of phase to increase the production of the machine.

The machine has been described as being operable to apply labels to one side of articles by operating either the drum 19 or the drum 20 separately, and to apply labels to both sides of articles by operating the drums 19 and 20 in synchronism so that paired applicators thereof apply front and back labels to the articles. As is shown in FIG. 11 of the drawings the drums 19 and 20 may be operated so that one drum is one-half cycle out of phase with relation to the other whereby one drum 20 will apply labels to one side of the alternately spaced articles 12', and the other drum 19 will apply labels to the other side of the alternately spaced articles 12". In such an arrangement it is preferred also that the label wiping devices 60', 60' at the pressure station 18 be each constructed to engage the alternately spaced labels on the articles to complete the application to such articles, as shown in FIG. 11. By this method of operation it will be understood that it is possible to double the production of the machine.

Figure 12:
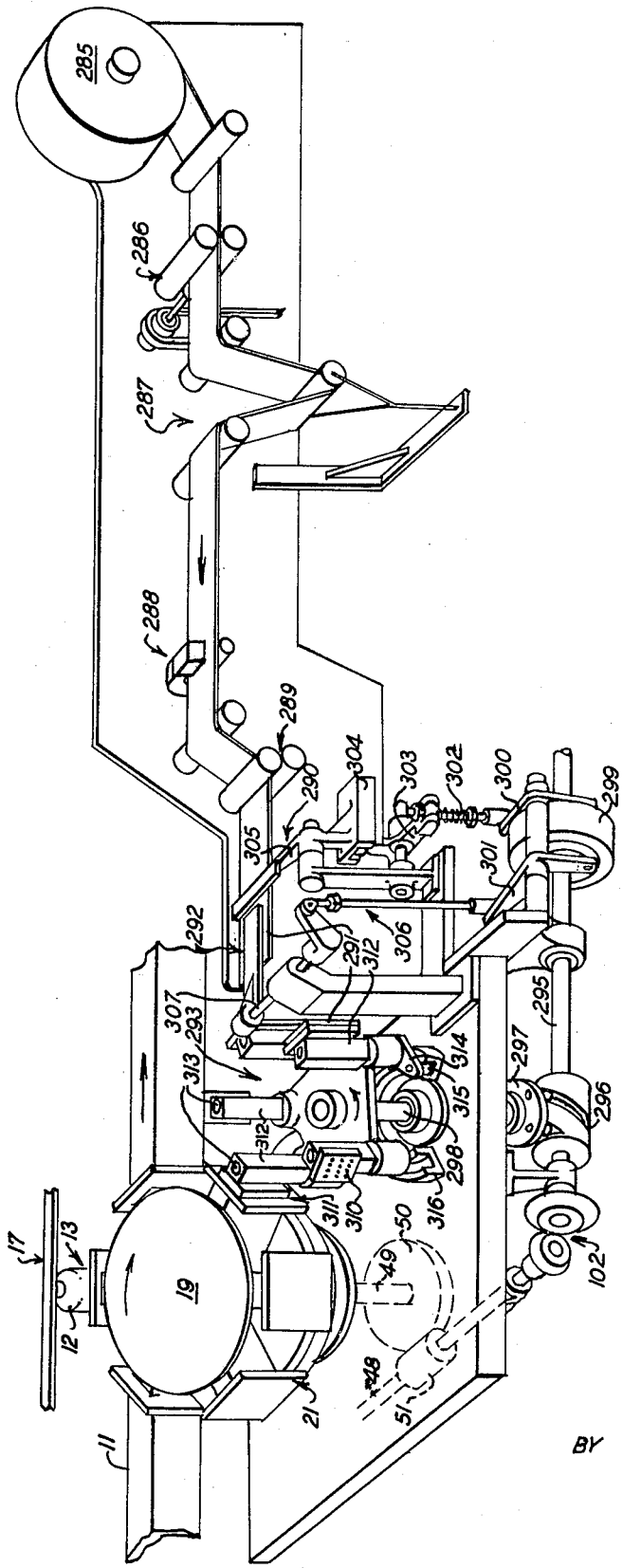
FIG. 12 is a perspective view showing how a web of labels from a roll thereof may be fed to one of the label applicator drums.

FIG. 12 of the drawings, illustrates how the labels may be supplied to the drums 19, 20 from rolls of the labels rather than from the above described hoppers 41. In the embodiment of FIG. 12 the constructions of the drums 19, 20 and the mechanisms in the machine associated therewith except for the label feed, are similar to that previously described and such drums and mechanisms will function in the manner already described. Further, while FIG. 12 shows only the roll feed means associated with drum 19, it will be understood that a similar roll feed means may be associated with the drum 20. The roll feed means for each drum will be so arranged in the machine that the line of feed of the label strip from the supply roll thereof will be in substantial parallelism with the line of feed of the articles and in a direction substantially opposed to the direction of feed of the articles, as is indicated by the arrows in FIG. 12 of the drawings. The label feed means shown in FIG. 12 except in the proximity of the transfer of the cut labels to the drums, is essentially similar in construction to the label feed means described and illustrated in the patent application Ser. No. 523,756, filed by George W. von Hofe on Jan. 28, 1966. Like in the construction disclosed in said application, the labels are fed in strip form from a roll 285 by draw rolls 286 into a supply loop 287. The strip is drawn from the supply loop 287 and past scanning means 288 by the intermittently operating feed rolls 289 and fed by the latter toward mechanism 290 for intermittently severing the terminal label 291 from the label strip. The severed label 291 is carried by a vacuum label transfer device 292 to a rotatable drum 293 which picks up the severed label 291 from the vacuum device 292 and transfers it to the applicator 21 of the drum 19.

The draw rolls 286, feed rolls 289, cutting mechanism 290, vacuum device 292 and drum 293 are all connected in driven relation to the transverse shaft 48 which drives the applicator drum 19. As is shown in FIG. 12, such connection to shaft 48 is made through the gearing 102 which in this embodiment connect each end portion of shaft 48 to a continuously driven shaft 295 on which are mounted the cams for actuating the aforesaid mechanism. Thus shaft 295 is provided with a cylindrical cam 296 which is connected to a cam roller carrying plate 297 mounted on the lower end of the vertical drum shaft 298, and which is designed to drive the drum 293 through such parts with an intermittent rotational movement. The shaft 295 is further provided with a cam 299 provided with cam tracks on its opposite faces and with which are engaged the rollers provided on a pair of pivotally mounted cranks 300, 301. Crank 300 is connected by links 302 and 303 to a cam 304 for imparting intermittent pivotal movement to the cutting blade 305 of the cutting mechanism 290. The crank 301 is connected by linkages 306 to a rotatably mounted shaft 307 on which the label transfer member 292 is mounted. The cam track on cam 299 with which crank 301 is connected is designed to swing the label transfer member 292 periodically from its label receiving position, as shown in FIG. 12, downwardly about the axis of shaft 307 to deposit the label upon one of the vertically disposed label transfer plates 310 provided on drum 293. Cam 296 is designed to bring the label transfer plates 310 successively to a stop in position to receive labels from the transfer member 292; the transfer plate in such position as shown in FIG. 12 having already received a terminal label 291 and being ready to move from such position, and the transfer member 292 having returned to label receiving position and ready to support the succeeding terminal label 291 to be cut by the cutting mechanism 290 from the label strip. The design of cam 296 is also such that in the step-by-step movements of the label transfer plates 310, adjacent of such plates will dwell on one side of and on the other side of the place 311 of label transfer to the label applicators of drum 19, and such plates will be in motion past such place 311 during their rotative movements intermediate such places of dwell.

The label transfer plates 310 are each mounted on a block 312 connected to a vertical rotatable shaft 313 having connected to its lower end an arm 314 carrying a cam roller 315 which engages a cam track provided in an annular cam 316. The track in cam 316 is so designed that at the place 311 of label transfer, the label carried by a transfer plate 310 will be given an advancing movement similar to the advancing movement given a terminal label by the label hopper 41, and the transfer of such label to an applicator 21 will be accomplished in the same manner described with respect to the transfer of a terminal label from the hopper 41 to an applicator 21. Suction is applied to the transfer plates 310 in any suitable manner so that it is effective in such plates during that portion of their cycle of operation from the place at which they receive labels from the transfer member 292 to said place of transfer 311.

While we have hereinabove described and illustrated in the accompanying drawings, preferred embodiments of the invention, it will be understood that changes may be made therein without departing from the spirit of the invention or the scope of the appended claims.

We claim:

1. In a labeling machine having a label applicator for carrying and applying a label to an article, said applicator being provided with a label supporting surface, means supporting the label applicator for movement along a closed path about a first axis toward and past a station adjacent to said path at which a moving element will coact with said applicator surface to perform an operation with the label, means for operating said supporting means to move the label applicator toward and past the station without interruption in the movement thereof, said supporting means including applicator carrying means mounted for pivotal movement about a second axis on a radial line of the closed path through such second axis for carrying the applicator with its label carrying surface disposed across said radial line, means connected to said applicator carrying means for maintaining said applicator surface in certain angular relation to said radial line as said applicator moves toward said station, and operable in the region of such station to positively move said applicator carrying means while it continues its movement about said first axis to change the angular position of said applicator surface relative to said radial line without changing the position of said second axis relative to said radial line in a direction longitudinally of the path, and means cooperative with said applicator carrying means to cause the latter to change the position of said applicator in the direction of such radial line during the uninterrupted movement thereof past said station to enable the moving element to cooperate with said applicator surface in its changed angular and radial positions to affect the accomplishment of such operation on the said portion of the label.

2. In a labeling machine as defined in claim 1, in which the second axis about which said applicator carrying means is mounted for pivotal movement is fixed relative to the radial line and parallel to said first axis.

3. In a labeling machine as defined in claim 1, in which said applicator carrying means, said operative means and said cooperative means are connected and arranged to enable said applicator surface to effect the accomplishment of such operation on substantially the entire area of the label.

4. In a labeling machine as defined in claim 1, including a movable source of label supply mounted at said station, and means for moving said source in timed relationship to the label carrying surface of said label applicator as the latter passes such source, and in which said cooperative means and said carrying means are constructed and arranged to move the latter so that the label carrying surface of said label applicator is maintained parallel to a label supported at said source of label supply during the label picking operation of said label applicator.

5. In a labeling machine as defined in claim 4, in which said applicator carrying means and raid cooperative means are constructed and arranged to reduce the normal velocity tended to be imparted to said applicator by said moving means when said applicator is at the label supply station and in position to receive a label from said movable source of label supply.

6. In a labeling machine as defined in claim 5, in which said means for moving said source of label supply is constructed and arranged to move said source so that in the transfer of a label therefrom to said applicator, said source moves at a speed less than its speed of movement intermediate such label transfer actions thereof.

7. In a labeling machine as defined in claim 4, in which said movable source of label supply comprises a label magazine supporting a stack of labels standing on edge with the terminal label at the open end of said magazine, and in which said cooperative means and said carrying means are constructed and arranged to move said label applicator into such open end of said magazine to receive the terminal label.

8. In a labeling machine as defined in claim 1, including a rotatable label transfer drum mounted at said station and having a plurality of label carrying portions for movement around the axis of rotation of said drum, means for rotating said drum to successively move said label carrying portions with an intermittent motion to a place of label pickup, means at such place for supplying a label to a label carrying portion dwelling thereat, said rotating means being constructed and arranged to bring each label carrying portion to a condition of dwell prior to its arrival at a place of transfer at said station and to move such label carrying portion without interruption past such place of transfer, and means for moving each label carrying portion traveling past such place of transfer in timed relation to the label carrying surface of said label applicator as the latter passes such place of transfer; said cooperative means and said carrying means being constructed and arranged to move the latter so that the surface of said label applicator is maintained parallel to a label supported by a label carrying drum portion at said place of transfer during the transfer of the label from such drum portion to said label applicator.

9. In a labeling machine, a label applicator for carrying and applying a label to an article, means supporting said label applicator, means for moving said supporting means to move said applicator along a closed path, said supporting means including means operable during the movement of said applicator along said closed path to pivot said applicator about a pivot point traveling along a path substantially parallel to and spaced from said closed path and to translate said applicator from one position to another relative to said pivot point along a line extending through said pivot point and disposed transversely of said paths, and means cooperative with said operable means to effect at least one of such movements of said applicator at a given portion of the closed path of movement of said applicator.

10. In a labeling machine, a label applicator for carrying and applying a label to an article, a rotatable shaft, means to rotate said shaft, means connected to said shaft and providing a moving pivot point located at a fixed radial distance relative to said shaft, applicator supporting means mounted on said connected means for movement as a whole about said movable pivot point and including a slide member carrying said label applicator and movable to translate the latter from one position to another relative to said pivot point, first cam means mounted on said applicator supporting means, and second cam means cooperable with said first cam means to actuate said applicator supporting means to cause said applicator to assume varying positions relative to said pivot point in its travel about said shaft.

11. In a labeling machine as defined in claim 6 in which said first and second cam means coact to positively pivot said applicator supporting means about said movable pivot point, and further means connected to said slide member and operable to translatively move said label applicator relative to said pivot point.

12. In a labeling machine, means for moving articles to be labeled along a predetermined rectilinear path toward and past a place of label application, means for simultaneourly applying front and back labels to opposite sides of successive articles moving along said path past said place, means spaced from one side of said path for transferring the front labels from one source of supply to said applying means, means spaced from the other side of said path for transferring the back labels from another source of supply to said applying means, means for supporting a roll of front labels, means for feeding a strip of front labels from said roll to said front label transfer means, means for supporting a roll of back labels and means for feeding a strip of back labels from said back label roll to said back label transfer means, said front label feeding means and said back label feeding means being constructed and arranged so that the lines of feed of said strips of front and back labels are substantially parallel to each other and to said rectilinear article path.

13. In a labeling machine as defined in claim 12, in which said supporting means for said label rolls and said front and back label feeding means are constructed and arranged so that the directions of feed of the labels from said rolls thereof to the articles are substantially opposed to the direction of feed of the articles except in the proximity of the application of such labels to the articles.

14. In a labeling machine, means for moving articles uninterruptedly and in successive spaced relation along a predetermined path at a given velocity, means for moving labels uninterruptedly and in successive spaced relation along a curvilinear path at another velocity, said curvilinear path being different from said predetermined path and approaching said predetermined path so as to be adjacent thereto at a given place, and means to modify the movement of said label moving means in a direction of the path of movement of the latter and transversely thereto to cause a label carried thereby to match an article in both position and velocity during their motions when their paths are at their closest proximity.

15. In a labeling machine wherein articles flow in a given path through said machine in an uninterrupted stream at a given velocity, first means for separating the articles and establishing the flow velocity of said articles in separated relation along said path, second means for simultaneously readjusting the positions of a multiplicity of the articles on such path so that they will successively come into accurate registration with label applying means at a given place along such path, label applicator means at said given place for successively labeling each article arriving at such place, a multiplicity of wipers at another place for simultaneously completing the application of labels to a plurality of successively arranged articles, and drive means so constructed and arranged to drive said first means one operation per cycle, to drive said second article adjusting means a fraction of an operation per cycle, to drive said label applicator means one operation per cycle, and to drive said label wipers at a fraction of an operation per cycle, depending on the multiple of adjusting devices and label wipers, and to drive the same so that they are all operative in timed relation with one another.

16. In a labeling machine, means for moving articles to be labeled along a predetermined path extending substantially centrally of the machine, means at the entry end of said path for separating the articles into given spaced relation, means located on both sides of said path for readjusting the position of an article passing therebetween so that it will come into accurate registration with label applying means at a given place along said path, label applying means on at least one side of said path at said given place for applying labels to articles coming into registration therewith; means located on both sides of said path for wiping the labels carried by articles passing therebetween, a drive motor, a main drive shaft drivenly connected to said motor and extending substantially centrally of the machine beneath said article moving means, and means connecting said separating means, said article readjusting means, said label applying means, and said label wiping means, to said main drive shaft and constructed and arranged to drive the same in timed relation with one another.

17. In a labeling machine, means for moving articles to be labeled in predetermined spaced tandem relation uninterruptedly along a rectilinear path, means adjacent to said path for applying labels to the articles while they are traveling along said path, said label applying means including a plurality of label applicators movable in a closed path and spaced apart so that the total of the distances between the midpoints of all of said applicators is greater than the total of the distances between the midpoints of the same number of successive articles on said rectilinear path, means for moving said applicators successively during the movement thereof along said closed path into applying contact with successive articles passing a given place in said rectilinear path, and means for successively moving said applicators as each approaches said given place so that each such applicator will temporarily change its position relative to adjacent applicators in a direction of the path of movement of said applicators and move with an article for a substantial distance in the same direction and at the same linear speed as the article.

18. In a labeling machine as defined in claim 17, in which said label applying means is composed of two series of applicators, one of such series being located on one side of said rectilinear path and the other of such series being located on the other side of said path, and the applicators in each series being movable along a closed path, said applicator moving means moving the applicators in said series in opposite directions along the closed paths thereof and in paired relation so that paired successive applicators in both series will simultaneously and temporarily change its position in directions of the paths of movement thereof as they approach said given place, said moving means including means for supporting each of said two series of applicators for movement transversely of the paths of movement thereof, and means for adjusting said supporting means to adjust simultaneously each pair of such series of applicators transversely of said paths of movement thereof and relative to the articles movable along said rectilinear path.

19. In a labeling machine of the kind wherein articles to be labeled are moved in predetermined spaced relation uninterruptedly in a straight path, means adjacent to said path for applying individual labels one at a time to said articles while said articles are in motion, said applying means having label carrying portions, means for supporting said label applying portions, and means for moving said supporting means along a substantially arcuate path, said supporting means being constructed and arranged so that as it moves along said arcuate path it is operable to move said label carrying portions successively along a substantially arcuate path for a portion of their motion, then successively substantially in a straight line when in label applying contact with the articles and then successively in a substantially arcuate path after making such label applying contact.

20. In a labeling machine, a rotatable drum having label carrying portions constructed and arranged for composite movement relative to the axis of rotation of said drum during the rotational movement thereof at a station located at a given place adjacent to the path of movement of said label carrying portions, and capable of moving labels carried thereby in the region of such station in a line tangent to a point moving about such drum axis during a portion of such rotational movement of the drum, so that during such portion of rotational movement the labels travel along a substantially rectilinear path spaced from such drum axis a distance greater than an arcuate portion of the path of movement of said label carrying portions.

21. In a labeling machine, a rotatable shaft, a plurality of label applicators mounted on said shaft, a conveyor for moving articles to be labeled in a line past said label applicators, a magazine adapted to hold labels, a glue applicator adapted to apply glue to labels supported on said label applicators, stations at which said label applicators pick labels from said magazine, receive glue from said glue applicator, and apply said labels to the articles in said line thereof, the said label applicators being so constructed and controlled as to have successively a temporary change in velocity in a direction of the path of movement thereof at at least two of said stations without modification of the rotational speed of said shaft, and to have a different velocity in such direction at said two stations.

22. In a labeling machine, means for moving articles to be labeled in spaced relation along a rectilinear path without interruption in such movement thereof, label applying means mounted on one side of said path and having label carrying portions for applying labels to alternate articles in said rectilinear path, label applying means mounted on the other side of said path and having label carrying portions for applying labels to alternate articles in said rectilinear path, one of said label applying means being one half cycle out of phase with the other label applying means so that each of said label applying means applies a label to alternate successive articles in said rectilinear path and means for supporting the articles in position on the conveyor during the application of labels thereto by both of said label applying means, whereby said out-of-phase label applying means can operate in an alternate fashion to apply labels to alternate sides of alternate articles.

23. In a labeling machine, means for moving articles to be labeled in predetermined spaced relation uninterruptedly along a straight path, means adjacent to said path for successively applying individual labels to successive articles as the latter move past said applying means, a label wiper comprising a plurality of label engaging members mounted on a bar, a pair of crank arms supporting said bar, a pair of vertical shafts connected to said crank arms, means for driving said shafts at a given constant velocity, a fixed cam associated with each of said shafts, and an articulated end on each of said crank arms connected to and controlled by said fixed cams, said cams and cranks being constructed and arranged so that the constant input velocity of said shafts is transformed into a variable angular velocity such that the motion imparted to the label engaging members of said label wiper while the latter are in contact with said articles is the same as the motion of said articles.

24. In a labeling machine as defined in claim 23, including means for driving said shafts at said given constant velocity, and a heavy, rotating mass coupled to said drive means to maintain constant the velocity of said shafts when the load of pressing said wiper members into contact with said articles takes place.

25. In a labeling machine in which articles to be labeled are moved in aligned successive relation along a straight path, means at one station in the machine located adjacent to said path for performing an operation on the articles as they advance along said path, and means at another subsequent station for performing an operation on said articles complemental to the operation performed at said one station, said means at said other station comprising a first group of article engaging members located on one side of said path and a cooperating second group of article engaging members located on the other side of said path, means for moving said first and second groups of members toward and away from each other and in their advanced positions causing them to simultaneously exert a paired grip on a plurality of articles moving therebetween on said path, said moving means comprising a plurality of rotatable shafts, means for rotating said shafts at a constant given velocity, means constructed and arranged to convert the constant velocity input of said vertical shafts into a variable angular velocity, and means connected to said groups for applying the converted variable angular velocity to said groups, said converting and connecting means being constructed and arranged to cause the variable angular velocity applied to said groups to move the article engaging members thereof in the same direction and at the same velocity as the articles during their contact with the latter.

26. In a labeling machine as defined in claim 25, in which said means at said one station comprise means for spacing the articles on said path so that they advance along the latter in given spaced relation, and in which said means at said other station rearrange said spaced articles so that they will come into accurate registration with label applying means at a third subsequent station as they move through the latter, and in which said groups of article engaging members each have associated therewith a moving means composed of a rotatable shaft rotated at a given velocity, and velocity converting means composed of an oscillatable arm and cam means connecting said arm to said rotatable shaft, said means for applying the variable angular velocity imparted to said arm to said group comprising a pair of spaced shafts connected in driven relation to said arm, an eccentric connected to each of said paired shafts, a slide guide mounted on said eccentrics, a slide slidably carried by said slide guide and carrying said group of article engaging members, and means normally biasing said slide into engagement with the articles on said path.

27. In a labeling machine as defined in claim 26, in which one of said groups of article engaging members is yieldably connected to its associated slide, and in which the other of said groups of article engaging members is connected in solid condition to its associated slide.

28. In a labeling machine as defined in claim 25, in which said means at said one station comprise means for applying labels to the articles as they advance along said path, and in which said means at said other station wipe the labels applied by said applying means to the articles, and in which said groups of article engaging members each have associated therewith a pair of rotatable shafts rotated at a given velocity, and velocity converting means composed of a pair of oscillatable arms and cam means connecting said arms to said rotatable shafts, and means supporting each of said groups on its associated pair of oscillatable arms.

29. In a labeling machine, a rotatable drum having label carrying portions constructed and arranged for composite movement relative to the axis of rotation of said drum during the rotational movement thereof, and capable of moving labels carried thereby in a line tangent to a point moving about such drum axis during a portion of such rotational movement of the drum, each of said label carrying portions comprising a supporting member mounted for pivotal movement about a vertical axis spaced a given radial distance from said drum axis, a slide mounted on said member for linear movement radially outwardly from said vertical axis, means normally biasing said slide in one direction relative to said vertical axis, a suction plate carried by said slide, a resilient label carrying member mounted on said suction plate, first means cooperative with said supporting member to oscillate the same about said vertical axis, and second means cooperative with said slide and resilient means therewith, to control the displacement of said label carrying member relative to said vertical axis.

30. In a labeling machine as defined in claim 29, including means for feeding articles in spaced relation along a straight path passing through a given place located adjacently to said rotatable drum, said first and second cooperative means being constructed and arranged in the region of said given place to give said label carrying member such composite motion as to cause the latter to move in a line parallel to the path of movement of the articles for a given period, means for applying suction to said suction plate as said label carrying member approaches said plate and until it moves along said parallel line, and means for furnishing air under pressure to said suction plate during said given period to positively transfer the label from said label carrying member to an article.

31. In a labeling machine as defined in claim 29, including a label hopper located at a given place adjacently to said rotatable drum and adapted to carry a plurality of labels on edge with the terminal label facing the label carrying portions of said drum, means supporting said label hopper for pivotal movement about a vertical axis, and means for oscillating said hopper about said vertical axis so that in its advancing movements it moves in the direction of the rotation of said drum, said first and second means being constructed and arranged in the region of said hopper to cause said label carrying member to move into contact with the terminal label in the hopper and then to move in the same direction and velocity as such terminal label during the advancing movement of the hopper.

32. In a labeling machine as defined in claim 31, including a vertical shaft supporting said drum, and in which said means for oscillating said hopper is connected in locked relation to and driven by said shaft, and including means for applying suction to said suction plate when said label carrying member moves into contact with the terminal label in said hopper to enable said member to strip the terminal label from the hopper during the advancing movement of the latter.

33. In a labeling machine, a rotatable drum having a plurality of label carrying portions for successively moving labels to a place of application thereof to bottles, means located adjacently to said drum at a second place for successively supplying labels to said drum portions, means located adjacently to said drum at a third place for and cooperative with said drum portions to successively render adhesive the labels supplied to said drum portions by said supplying means, said drum portions having associated therewith means for successively moving the same relative to said drum and to said adhesive rendering means in the region thereof and during the adhesive rendering operation while the drum continues its rotative movement, and means for preventing the effective operation of said adhesive rendering means when a drum portion arriving at said third place has failed to pick up a label at said second place including means for blocking the operation of said drum portion moving means at the adhesive applying station, means operative by the failure of a drum portion to pick up a label, and a solenoid controlled by said operative means and controlling said blocking means.

34. In a labeling machine, a rotatable drum having a plurality of label carrying portions for successively moving labels to a place of application thereof to bottles, means located adjacently to said drum at a second place for successively supplying labels to said drum portions, means located adjacently to said drum at third place for and cooperative with said drum portions to successively render adhesive the labels supplied to said drum portions by said supplying means, said adhesive rendering means comprising a glue roller, a drive motor for the machine, a main shaft connected to and driven by said motor, said main shaft comprising a body portion and an extension of said body portion, means connecting said extension in positive driven relation to said drive motor for continuous rotation thereby, means connecting said glue roller in positive driven relation to said shaft extension for continuous rotation thereby, a clutch connecting said extension to said shaft body, a brake associated with said clutch and operative on said shaft body, and means for substantially simultaneously operating said clutch and brake to disconnect and stop the rotative movement of said shaft body without interruption of the rotative movement of said shaft extension and said glue roller.

35. In a labeling machine as defined in claim 31, including a source of vacuum, means for successively bringing said vacuum source into communication with said suction plates of said label carrying portions including, a stationary suction port at said place of location of said label hopper, an electrically controlled valve between said suction port and said source, and a switch engageable by an article in its feed toward said drum and controlling said valve, said switch being so located along the line of feed of the article that it is actuated by the article to operate said valve to connect said suction port to said vacuum source as said label carrying member moves into contact with the terminal label in said hopper.

36. In a labeling machine, means for moving articles to be labeled in spaced relation along a rectilinear path, means at a place along said path for simultaneously applying front and back labels successively to articles moving therealong, said applying means having a first set of applicators for carrying front labels, a second set of applicators for carrying back labels, and means for moving the applicators in both sets in paired relation, first means for supplying front labels to said first set of label applicators, second means for supplying back labels to said second set of applicators, means for rendering adhesive the front and back labels delivered to said first and second set of applicators, means operative when one applicator in either of said first or second sets of applicators fails to carry away a label from its associated label supply means, and means controlled by said operative means and operative to render both said one applicator and the other applicator paired with said one appplicator incapable of applying label material to an article at said place of label application, whereby said article moves past said place without change in its condition.

37. In a labeling machine as defined in claim 36, including moving means operative separately to advance the applicators separately towards an adhesive rendering means, means successively creating a suction condition in each of said applicators to hold a label delivered thereto by said associated supplying means therefor, said operative means including vacuum means for successively checking the vacuum condition in said paired applicators and operative when the suction condition in one of said paired applicators lessens due to the lack of a label thereon, to actuate said controlled means, said controlled means including blocking means for preventing each of said applicator moving means advancing said applicators toward said adhesive rendering means, and means controlled by said vacuum means to actuate said blocking means to simultaneously block both of the paired applicators.

38. In a labeling machine, a rotatable drum having a plurality of label carrying portions for successively moving labels to a place for application thereof to articles, means located at a second place adjacent to said drum for successively supplying labels to said drum portions, means located adjacently to said drum at a third place for successively rendering adhesive the labels supplied to said drum portions by said supplying means, a motor for the machine, a main shaft, means connecting said main shaft in driving relation to said supplying means and said adhesive rendering means, an electric clutch for connecting said motor in driving relation to said main shaft, an electric brake mounted on the machine so as to engage with the portion of said main shaft connected in driven relation to said motor by said electric clutch, a circuit including said electric clutch, said electric brake, a control switch, and a stop button, and a cam connected in driven relation to said main shaft and controlling said control switch, said circuit being constructed and arranged that said stop button is operative in any portion of the cycle of said drum to stop the machine and said control switch will maintain said electric clutch energized until actuated by said cam, said cam being constructed to actuate said control switch in the interval of time in which an applicator has moved past said adhesive rendering means and the adjacent following applicator has not as yet arrived at said adhesive rendering means, said circuit being operative on actuation of said control switch to simultaneously deenergize said electric clutch and actuate said electric brake, whereby the drive of said motor to said main shaft is broken and said electric brake grips said main shaft to immediately stop the same.

39. In a labeling machine, as defined in claim 38, in which said circuit includes an emergency stop button arranged therein so that on operation thereof said control switch is by-passed to effect an immediate stoppage of the machine irrespective of the portion of the drum's cycle in which such operation is made.

40. In a labeling machine of the kind wherein articles to be labeled are moved in spaced relation along a rectilinear path, and means are provided adjacent to said path for applying labels to said articles while they are in motion along the aforesaid path, characterized in that the label applying means comprises a plurality of like label transfer devices spaced apart from one another and each having a label carrying surface, means movable supporting each of said transfer devices for movement of the label carrying surface thereof relatives to the label carrying surfaces of the other transfer devices in directions transverse to and longitudinally of said article path, means for moving each of said transfer devices through a curvilinear path extending to and past a place adjacent to said rectilinear path to bring a label carried thereby into contact with an article at such place, and means for moving said supporting means to cause the label carrying surface of such label carrying transfer device to transfer its movement in the region of such place from such curvilinear path to one in which it moves rectilinearly in the direction of feed of an article along said article path while holding said label in contact and under force with the article.

41. In a labeling machine, means for moving articles with labels partially attached at a uniform velocity in spaced relation along a straight path, a wiping station positioned alongside the path of said articles, two vertical uniformly rotating shafts, fixed cams attached to housings supporting said shafts, arms attached to said rotating shafts, articulated ends mounted on said arms and said ends carrying cam rolls running in said fixed cams and pins located in a bar joining said articulated ends together, the paths of said fixed cams being such that said cam rolls will for a portion of a cycle of rotation move away from the centers of said rotating shafts, and for a portion of a cycle of rotation move toward the centers of said rotating shafts, and wipers mounted on said bar to press said labels into contact with said articles.

References Cited

UNITED STATES PATENTS

| 2,214,096 | 9/1940 | Weiss | 156—568 |
| 2,525,741 | 10/1950 | Von Hofe et al. | 156—571 XR |
| 2,773,617 | 12/1956 | Weiss | 156—568 XR |
| 2,936,921 | 5/1960 | Schulz | 156—568 |
| 3,306,803 | 2/1967 | Holstein | 156—357 |

JOHN T. GOOLKASIAN, Primary Examiner

J. D. SMITH, Assistant Examiner

U.S. Cl. X.R.

156—357, 568

PO-1050
(5/69)

UNITED STATES PATENT OFFICE
CERTIFICATE OF CORRECTION

Patent No. 3,522,134          Dated July 28, 1970

Inventor(s) George W. von Hofe and John F. Spano

It is certified that error appears in the above-identified patent and that said Letters Patent are hereby corrected as shown below:

Column 3, line 69, "jaws" should be --jaw--.

Column 8, line 59, "moved" should be --move--.

Column 18, line 21, (Claim 5) "raid" should be --said--.

Column 26, line 4, "relatives" should be --relative--.

SIGNED AND
SEALED

OCT 27 1970

(SEAL)
Attest

Edward M. Fletcher, Jr.
Attesting Officer

WILLIAM E. SCHUYLER, JR.
Commissioner of Patents